United States Patent
Kaneda et al.

(10) Patent No.: US 7,536,026 B2
(45) Date of Patent: May 19, 2009

(54) IMAGE PROCESSING APPARATUS AND METHOD

(75) Inventors: Kitahiro Kaneda, Kanagawa (JP); Keiichi Iwamura, Kanagawa (JP); Ken-ichi Ohta, Kanagawa (JP); Yoshihiro Ishida, Kanagawa (JP); Shinichi Kato, Kanagawa (JP); Junichi Hayashi, Kanagawa (JP); Jun Tamaru, Tokyo (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/670,205

(22) Filed: Feb. 1, 2007

(65) Prior Publication Data
US 2007/0127771 A1    Jun. 7, 2007

Related U.S. Application Data

(62) Division of application No. 10/396,489, filed on Mar. 26, 2003, now abandoned.

(30) Foreign Application Priority Data

Mar. 29, 2002  (JP)  ............................. 2002-096171
Feb. 4, 2003   (JP)  ............................. 2003-027609

(51) Int. Cl.
  *H04K 1/00*  (2006.01)
(52) U.S. Cl. ..................... 382/100; 340/5.86
(58) Field of Classification Search ................ 382/100, 382/176, 232; 713/176; 358/3.28; 380/54, 380/55; 340/5.86
See application file for complete search history.

(56) References Cited

U.S. PATENT DOCUMENTS

| 3,784,289 | A | 1/1974 | Wicker | ........................ 350/321 |
| 5,159,630 | A | 10/1992 | Tseng et al. | ................... 380/18 |
| 5,227,871 | A | 7/1993 | Funada et al. | .................. 358/75 |
| 5,287,203 | A | 2/1994 | Namizuka | ..................... 358/443 |
| 5,363,202 | A | 11/1994 | Udagawa et al. | ............. 358/501 |
| 5,363,454 | A | 11/1994 | Udagawa et al. | .............. 382/17 |

(Continued)

FOREIGN PATENT DOCUMENTS

EP    0 660 275 A2    6/1995

(Continued)

OTHER PUBLICATIONS

W. Bender, et al., "Techniques for Data Hiding," Proceedings of the SPIE, San Jose, CA, Feb. 1995, pp. 164-173.

(Continued)

*Primary Examiner*—Andrew W Johns
(74) *Attorney, Agent, or Firm*—Fitzpatrick, Cella, Harper & Scinto

(57) ABSTRACT

It is required to protect the copyrights and the like of partial images which form respective parts of an image obtained by reading an image, exchanged using a print as a medium, by an image scanner or the like. Input image data is divided into a plurality of image regions having different features, digital watermarks, which are embedded in the detected image regions by embedding methods corresponding to the features of the image regions, are extracted, and the availability of the input image is checked on the basis of the extracted digital watermarks.

9 Claims, 39 Drawing Sheets

U.S. PATENT DOCUMENTS

| | | | | |
|---|---|---|---|---|
| 5,430,525 | A | 7/1995 | Ohta et al. | 355/201 |
| 5,481,377 | A | 1/1996 | Udagawa et al. | 358/501 |
| 5,561,534 | A | 10/1996 | Ishida et al. | 358/448 |
| 5,600,720 | A | 2/1997 | Iwamura et al. | 380/1 |
| 5,636,292 | A | 6/1997 | Rhoads | 382/232 |
| 5,664,208 | A | 9/1997 | Pavley et al. | 395/777 |
| 5,666,419 | A | 9/1997 | Yamamoto et al. | 380/28 |
| 5,671,277 | A | 9/1997 | Ikenoue et al. | 380/7 |
| 5,694,486 | A | 12/1997 | Shigeeda et al. | 382/197 |
| 5,742,704 | A | 4/1998 | Suzuki et al. | 382/176 |
| 5,748,777 | A | 5/1998 | Katayama et al. | 382/199 |
| 5,757,961 | A | 5/1998 | Yamakawa et al. | 382/197 |
| 5,828,794 | A | 10/1998 | Katayama et al. | 382/298 |
| 5,847,849 | A | 12/1998 | Funada et al. | 358/530 |
| 5,848,185 | A | 12/1998 | Koga et al. | 382/173 |
| 5,861,619 | A | 1/1999 | Horino et al. | 235/470 |
| 5,903,646 | A * | 5/1999 | Rackman | 380/4 |
| 5,917,938 | A | 6/1999 | Funada et al. | 382/165 |
| 5,933,528 | A | 8/1999 | Katayama et al. | 382/197 |
| 5,937,395 | A | 8/1999 | Iwamura | 705/30 |
| 6,086,706 | A | 7/2000 | Brassil et al. | 156/277 |
| 6,088,454 | A | 7/2000 | Nagashima et al. | 380/49 |
| 6,111,994 | A | 8/2000 | Katayama et al. | 382/298 |
| 6,232,978 | B1 | 5/2001 | Ishida et al. | 345/427 |
| 6,346,989 | B1 | 2/2002 | Funada et al. | 358/1.14 |
| 6,425,081 | B1 | 7/2002 | Iwamura | 713/176 |
| 6,434,253 | B1 | 8/2002 | Hayashi et al. | 382/100 |
| 6,535,616 | B1 | 3/2003 | Hayashi et al. | 382/100 |
| 6,560,339 | B1 | 5/2003 | Iwamura | 380/201 |
| 6,563,936 | B2 | 5/2003 | Brill et al. | 382/100 |
| 6,647,125 | B2 | 11/2003 | Matsumoto et al. | 382/100 |
| 6,707,465 | B2 | 3/2004 | Yamazaki et al. | 345/629 |
| 6,741,758 | B2 | 5/2004 | Hayashi et al. | 382/294 |
| 6,801,636 | B2 | 10/2004 | Murakami et al. | 382/100 |
| 6,959,385 | B2 | 10/2005 | Murakami et al. | 713/176 |
| 7,006,660 | B2 | 2/2006 | Hayashi | 382/100 |
| 7,035,426 | B2 | 4/2006 | Nishikawa et al. | 382/100 |
| 7,058,820 | B2 | 6/2006 | Tagashira et al. | 713/193 |
| 7,068,809 | B2 | 6/2006 | Stach | 382/100 |
| 7,072,488 | B2 | 7/2006 | Iwamura | 382/100 |
| 7,146,502 | B2 | 12/2006 | Hayashi | 713/176 |
| 2001/0017717 | A1 | 8/2001 | Ishida et al. | 358/464 |
| 2002/0060736 | A1 | 5/2002 | Wakao et al. | 348/207 |
| 2002/0104003 | A1 | 8/2002 | Iwamura | 713/176 |
| 2002/0172398 | A1 | 11/2002 | Hayashi | 382/100 |
| 2002/0196465 | A1 | 12/2002 | Ohta | 358/1.16 |
| 2003/0044043 | A1 | 3/2003 | Kaneda | 382/100 |
| 2006/0078159 | A1 * | 4/2006 | Hamatake et al. | 382/100 |

FOREIGN PATENT DOCUMENTS

| | | |
|---|---|---|
| EP | 1 041 805 A2 | 10/2000 |
| EP | 1 069 758 A2 | 1/2001 |
| JP | 63-212275 A | 9/1988 |
| JP | 63-212276 A | 9/1988 |
| JP | 01-311678 A | 12/1989 |
| JP | 6-68301 A | 3/1994 |
| JP | 8-186706 A | 7/1996 |
| JP | 8-336040 A | 12/1996 |
| JP | 9-186603 A | 7/1997 |
| JP | 10-278629 A | 10/1998 |
| JP | 10-294726 A | 11/1998 |
| JP | 11-088662 A | 3/1999 |
| JP | 11-196259 A | 7/1999 |
| JP | 11-234502 A | 8/1999 |
| JP | 11-284516 A | 10/1999 |
| JP | 2000-184173 A | 6/2000 |
| JP | 2000-270195 A | 9/2000 |
| JP | 3136061 B2 | 12/2000 |
| JP | 2001-144932 A | 5/2001 |
| JP | 2002-163658 A | 6/2002 |
| JP | 2002-298122 A | 10/2002 |
| JP | 2002-368986 A | 12/2002 |
| JP | 2003-032487 A | 1/2003 |
| JP | 2003-032488 A | 1/2003 |
| WO | WO 01/80512 A2 | 10/2001 |

OTHER PUBLICATIONS

Nakamura, et al., "A Method of Watermarking Under Frequency Domain for Protecting Copyright of Digital Image," Symposium on Cryptography and Information Security (SCIS) 97-26A, Jan. 1997. (With English Abstract).

Onishi, et al., "A Watermarking Scheme for Image Data by PN Sequence," SCIS 97-26B, Jan. 1997. (With English Abstract).

Ishizuka, et al., "On An Experimental Evaluation of Steganography With Wavelet Transform," SCIS 97-26D, Jan. 1997. (With English Abstract).

Inoue, et al., "A Digital Watermark Technique Based on the Wavelet Transform and its Robustness Against Image Compression and Transformation," SCIS 98-3.2.A, Jan. 1998. (With English Abstract).

Bender, et al., *Nikkei Electronics*, Mar. 10, 1997, No. 684, pp. 164-168.

*Bit*, Sep. 1999, vol. 31, No. 9, pp. 25-31.

N. Chotikakamthorn, "Electronic Document Data Hiding Technique Using inter-Character Space," The 1998 IEEE Asia-Pacific Conf. on Circuits and Systems, 1998, pp. 419-422.

* cited by examiner

FIG. 14A

| BLOCK INFORMATION | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*PROPERTY 1: TEXT  2: PICTURE  3: TABLE  4: LINE  5: PHOTOGRAPH

FIG. 14B

| INPUT FILE INFORMATION |
|---|
| TOTAL NUMBER OF BLOCKS   N(=6) |

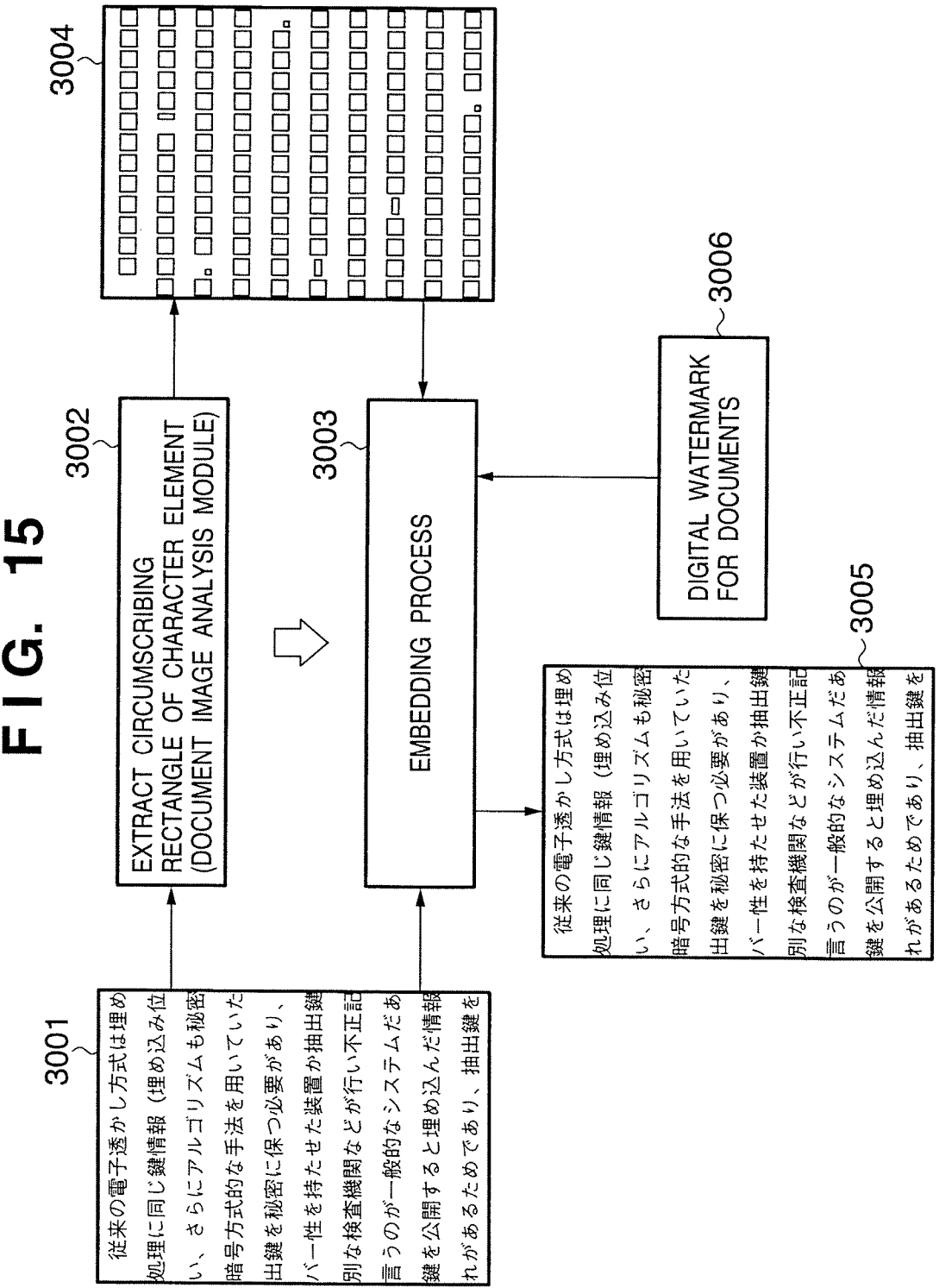

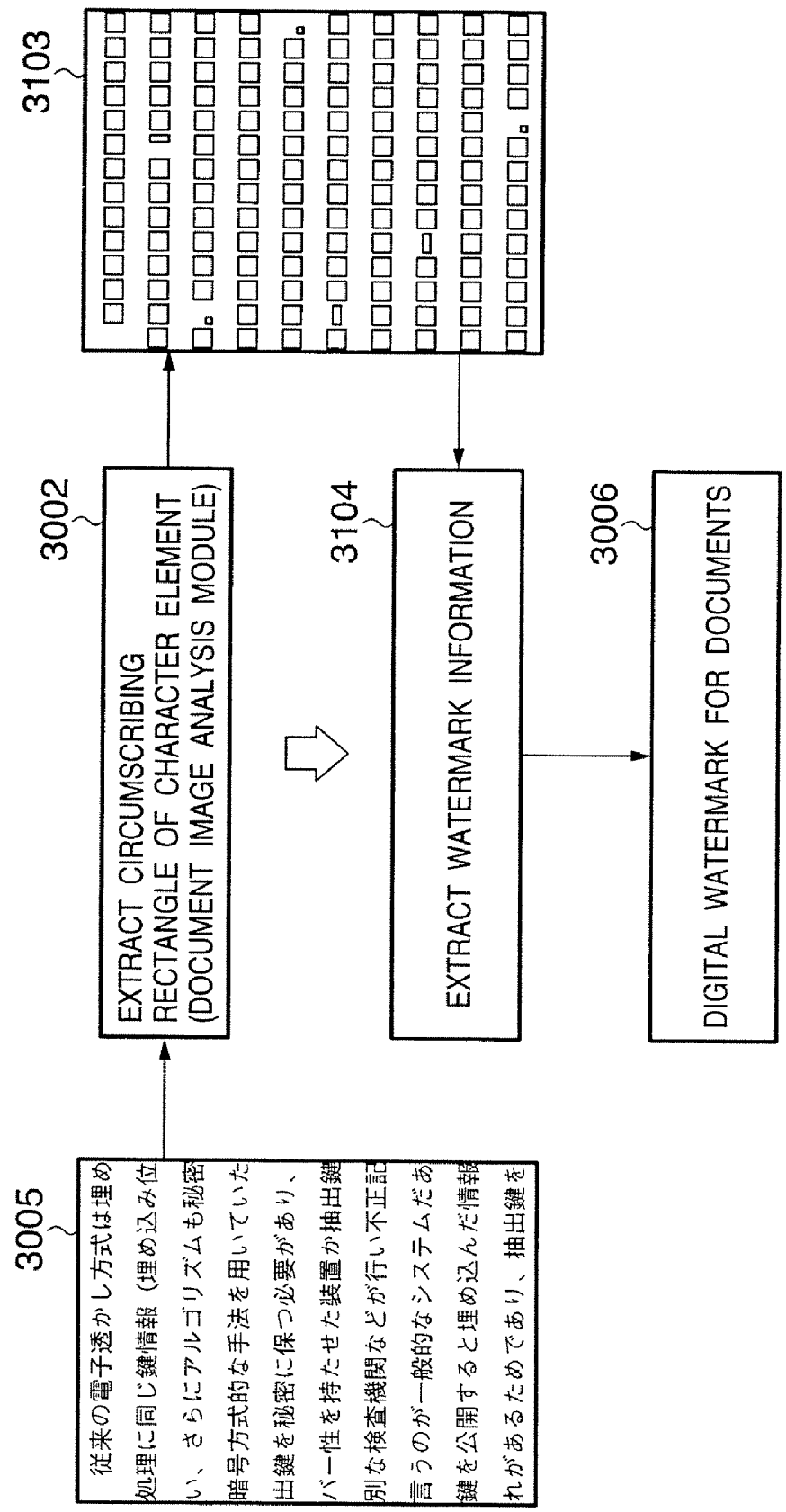

FIG. 21

| 1 | 15 | 14 | 4 |
|---|----|----|---|
| 12 | 6 | 7 | 9 |
| 8 | 10 | 11 | 5 |
| 13 | 3 | 2 | 16 |

4201

| 1 |  |  | 4 |
|---|---|---|---|
|  | 6 | 7 |  |
| 8 |  |  | 5 |
|  | 3 | 2 |  |

4202

| 1 | 8 | 7 | 2 |
|---|---|---|---|
| 6 | 3 | 4 | 5 |
| 4 | 5 | 6 | 3 |
| 7 | 2 | 1 | 8 |

4203

| 1 | 4 | 4 | 1 |
|---|---|---|---|
| 3 | 2 | 2 | 3 |
| 2 | 3 | 3 | 2 |
| 4 | 1 | 1 | 4 |

| 0.7 | 0.7 | −0.6 | −0.6 |
|---|---|---|---|
| −0.7 | −0.7 | 0.6 | 0.6 |
| 0.9 | 0.9 | −0.8 | −0.8 |
| −0.9 | −0.9 | 0.8 | 0.8 |

|     |     |     |     |
|-----|-----|-----|-----|
| $W_{03}$ | $W_{13}$ | $W_{23}$ | $W_{33}$ |
| $W_{02}$ | $W_{12}$ | $W_{22}$ | $W_{32}$ |
| $W_{01}$ | $W_{11}$ | $W_{21}$ | $W_{31}$ |
| $W_{00}$ | $W_{10}$ | $W_{20}$ | $W_{30}$ |

~ 4403

+ ax

|     |     |     |     |
|-----|-----|-----|-----|
| $I_{03}$ | $I_{13}$ | $I_{23}$ | $I_{33}$ |
| $I_{02}$ | $I_{12}$ | $I_{22}$ | $I_{32}$ |
| $I_{01}$ | $I_{11}$ | $I_{21}$ | $I_{31}$ |
| $I_{00}$ | $I_{10}$ | $I_{20}$ | $I_{30}$ |

~ 4402

=

|     |     |     |     |
|-----|-----|-----|-----|
| $I'_{03}$ | $I'_{13}$ | $I'_{23}$ | $I'_{33}$ |
| $I'_{02}$ | $I'_{12}$ | $I'_{22}$ | $I'_{32}$ |
| $I'_{01}$ | $I'_{11}$ | $I'_{21}$ | $I'_{31}$ |
| $I'_{00}$ | $I'_{10}$ | $I'_{20}$ | $I'_{30}$ |

| -0.6 | 0 | 0 | 0 |
|---|---|---|---|
| 0 | 0 | 0 | 0.8 |
| 0 | 0 | 0 | -0.9 |
| 0.7 | 0 | 0 | 0 | w2

| 0 | 0 | 0.8 | 0 |
|---|---|---|---|
| 0 | -0.6 | 0 | 1 |
| 0 | 0.7 | 0 | 1 |
| 0 | 0 | -0.9 | 0 | w3

| 0 | -0.6 | 0 | 0 |
|---|---|---|---|
| 0 | 0 | 0 | 0.8 |
| 0 | 0 | 0 | -0.9 |
| 0 | 0.7 | 0 | 0 | w4

| 0 | 0 | 0 | 0.8 |
|---|---|---|---|
| -0.6 | 0 | 0 | 0 |
| 0.7 | 0 | 0 | 0 |
| 0 | 0 | 0 | -0.9 |

F I G. 36
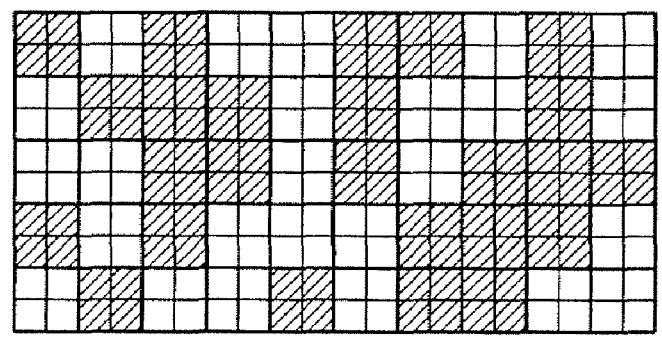
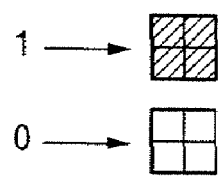

FIG. 37
1010011010
0111010010
0011010111
1010001110
0100101100
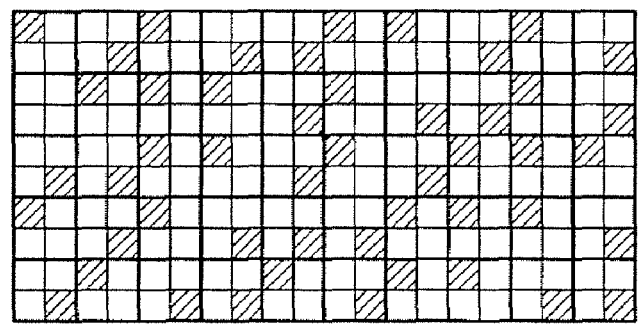
1 → 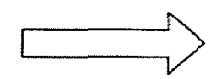
0 → 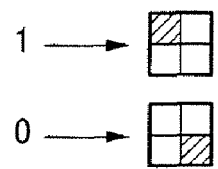

IMAGE PROCESSING APPARATUS AND METHOD

This application is a division of application Ser. No. 10/396,489 filed Mar. 26, 2003, now abandoned.

FIELD OF THE INVENTION

The present invention relates to an image processing apparatus and method and, more particularly, to embedding and extraction of digital watermark information in an image on which images having different features are mixed, and an image process of a digital document or the like.

BACKGROUND OF THE INVENTION

In recent years, computers and networks have advanced remarkably, and many kinds of information such as text data, image data, audio data, and the like are handled on the computers and networks. Since these data are digitized, it is easy to form copies of data with equivalent quality. For this reason, in order to protect the copyrights of data, copyright information, user information, and the like are often embedded as digital watermark information (to be simply referred to as "digital watermark" hereinafter) in image data and audio data.

"Digital watermarking" is a technique for embedding another information, which is visually and audibly imperceptible to a human being, in secrecy in image and audio data by a predetermined process of these data. By extracting a digital watermark from image and audio data, the copyright information, user information, identification information, and the like of that data can be obtained. With such information, for example, persons who made illicit copies, and apparatuses used to form illicit copies can be traced from the illicitly copied digital data. In other words, digital watermarking can be applied to protection of the copyrights and the like of images, anti-counterfeit technology, various kinds of information recording, and the like.

Conditions required of such digital watermarking are as follows.

(1) Quality: Digital watermark information must be embedded to be imperceptible, i.e., with least quality deterioration of source digital information.

(2) Robustness: Information embedded in digital information must remain undisturbed, i.e., embedded digital watermark information must never be lost by editing or attacks such as data compression, a filter process, and the like.

(3) Information size: The information size of information that can be embedded must be able to be selected in accordance with different purposes of use.

These conditions required for digital watermarking normally have a trade-off relationship. For example, upon implementing robust digital watermarking, relatively large quality deterioration occurs, and the information size of information that can be embedded becomes small.

Taking a multi-valued still image as an example, digital watermarking can be roughly classified into two methods, e.g., a method of embedding in the spatial domain and a method of embedding in the frequency domain.

Examples of the method of embedding a digital watermark in the spatial domain include an IBM scheme (W. Bender, D. Gruhl, & N. Morimoto, "Techniques for Data Hiding", Proceedings of the SPIE, San Jose Calif., USA, February 1995), G. B. Rhoads & W. Linn, "Steganography method employing embedded calibration data", U.S. Pat. No. 5,636,292, and the like, which employ patchwork.

Examples of the method of embedding a digital watermark in the frequency domain include an NTT scheme (Nakamura, Ogawa, & Takashima, "A Method of Watermarking in Frequency Domain for Protecting Copyright of Digital Image", SCIS' 97-26A, January 1997), which exploits discrete cosine transformation, a scheme of National Defense Academy of Japan (Onishi, Oka, & Matsui, "A Watermarking Scheme for Image Data by PN Sequence", SCIS' 97-26B, January 1997) which exploits discrete Fourier transformation, and a scheme of Mitsubishi and Kyushu University (Ishizuka, Sakai, & Sakurai, "Experimental Evaluation of Steganography Using Wavelet Transform", SCIS' 97-26D, January 1997) and a Matsushita scheme (Inoue, Miyazaki, Yamamoto, & Katsura, "A Digital Watermark Technique based on the Wavelet Transform and its Robustness against Image Compression and Transformation", SCIS' 98-3.2.A, January 1998) last two of which exploit discrete wavelet transformation, and the like.

Also, as methods to be applied to a binary image such as a digital document formed by text, line figures, and the like, a method of manipulating spaces in a text part (*Nikkei Electronics*, Mar. 10, 1997 (no. 684, pp. 164-168), a method of forming a binary image using binary cells (density patterns) each consisting of 2×2 pixels (Bit September 1999/Vol. 31, No. 9), and the like are known.

These methods are designed as pairs of digital watermark embedding and extraction processes, and are basically incompatible to each other. In general, methods of embedding a digital watermark in the spatial domain suffer less quality deterioration, but have low robustness. On the other hand, methods that exploit the frequency transformation suffer relatively large quality deterioration but can assure high robustness. That is, these methods have different features, i.e., some methods can assure high robustness but have a small information size of information that can be embedded, others can assure high quality but have low robustness, and so forth. Also, the embedding methods used for multi-valued images cannot be applied to binary images in principle.

Color images, monochrome text images, line figures, and the like are often observed when they are displayed on a monitor display, and are often printed. Recently, prints with very high image quality can be created using not only a color copying machine but also an inexpensive printer such as an ink-jet printer or the like. In addition, since an expensive color image scanner, and convenient image processing software and image edit software which run on a personal computer have prevailed, an image can be scanned from a print with high image quality, and an image having equivalent quality in practical use can be reproduced. Furthermore, an image is scanned from a print with high image quality, and monochrome binary character images, line figures, and the like can be extracted and diverted.

Various digital watermarking methods are available in correspondence with features, especially, those of image data in which a digital watermark is to be embedded, and a suited embedding method differs depending on image data. In each of these plurality of methods, digital watermark embedding and extraction processes are paired, but the different methods are incompatible to each other. For this reason, an embedding method dedicated to a multi-valued image is used for multi-valued images, and that dedicated to a binary image is used for document images. Nowadays, however, digital images shown in FIGS. 5 and 6, on which a photo image taken by a digital camera, a document created using wordprocessing software, and the like are mixed, are often created and printed. A digital watermarking method which can effectively applied to such digital image on which a plurality of image regions with different features are mixed and its print has been demanded. In the following description, a plurality of images having different features will be referred to as "dissimilar images", and an image on which dissimilar images are mixed will be referred to as a "mixed image".

Also, it is demanded to protect the copyrights and the like of individual dissimilar images which form a digital image which is scanned from a print of a mixed image using an image input apparatus such as an image scanner or the like. In other words, it is demanded to protect the copyrights and the like of individual images (to be referred to as "partial images" hereinafter) which form respective parts of images obtained by scanning an image, which is exchanged using a print as a medium, by an image scanner or the like.

In recent years, as for security measures for office documents, the idea based on ISO 15408 has globally spread, and such technical field is becoming increasingly important in that respect. As one of security management methods of document information, various kinds of digital watermarking techniques mentioned above have been proposed and used.

Security management can be used for various purposes such as illicit copy prevention of data, prevention of leakage or tampering of important information, copyright protection of document information, billing for use of image data and the like, and so forth, and various digital watermarking techniques have been proposed in correspondence with those purposes. For example, as a technique for imperceptibly embedding watermark information in digital image data, a method of computing the wavelet transforms of image data and embedding watermark information by exploiting redundancy in the frequency domain (disclosed in Japanese Patent Application No. 10-278629), or the like is known.

On the other hand, a binary image such as a document image has less redundancy, and it is difficult to implement digital watermarking for such image. However, some digital watermarking methods (to be referred to as "document watermarking" hereinafter) that utilize unique features of document images are known. For example, a method of shifting the baseline of a line (Japanese Patent No. 3,136,061), a method of manipulating an inter-word space length (U.S. Pat. No. 6,086,706, Japanese Patent Laid-Open No. 9-186603), a method of manipulating an inter-character space length (King Mongkut University, "Electronic document data hiding technique using inter-character space", The 1998 IEEE Asia-Pacific Conf. On Circuits and Systems, 1998, pp. 419-422, a method of handling a document image as a bitmap image expressed by two, black and white values (Japanese Patent Laid-Open No. 11-234502), and the like are known.

The above methods are characterized in that the user cannot perceive watermark information embedded in an image (to be referred to as "invisible watermarking" hereinafter). Conversely, a method of embedding watermark information which clearly indicating that the watermark information is embedded (to be referred to as "visible watermarking" hereinafter) is also proposed. For example, Japanese Patent Application No. 10-352619 discloses a method of embedding a reversible operation result of an original image and an embedding sequence by comparing the pixel position of the original image and the shape of a watermark image to be embedded so that the watermark information is visible to the user.

Digital watermarking basically aims at embedding of some additional information in image data itself, and protects an original image using the embedded additional information (e.g., prevention of unauthorized use, copyright protection, protection of tampering of data, and the like). In other words, digital watermarking does not assume any purposes for inhibiting the user from viewing an original image itself or for allowing only a user who has predetermined authority to copy data.

Protection of an original image is applied to the entire image. For this reason, the user cannot often view or copy even an image contained in a protected image, which need not be protected.

SUMMARY OF THE INVENTION

The present invention has been made to solve the aforementioned problems individually or together, and has as its object to embed a digital watermark in an image on which image regions having different features are mixed.

To achieve this object, a preferred embodiment of the present invention discloses an image processing apparatus comprising: a detector, arranged to divide an input image into a plurality of image regions having different features; an embedding section, arranged to embed digital watermarks in the respective detected image regions by embedding methods according to the features of the image regions; and an integrator, arranged to integrate the image regions embedded with the digital watermarks into one image.

It is another object of the present invention to extract a digital watermark from an image on which image regions having different features are mixed, and check the availability of the image.

To achieve this object, a preferred embodiment of the present invention discloses an image processing apparatus comprising: a detector, arranged to divide an input image into a plurality of image regions having different features; an extractor, arranged to extract digital watermarks embedded in the respective detected image regions by embedding methods according to the features of the image region; and a determiner, arranged to determine availability of the input image on the basis of the extracted digital watermarks.

It is still another object of the present invention to check the availability of an image for each image region.

To achieve this object, a preferred embodiment of the present invention discloses an image processing apparatus comprising: a detector, arranged to divide an input image into a plurality of image regions having different features; an extractor, arranged to extract digital watermarks embedded in the respective detected image regions by embedding methods according to the features of the image region; and a determiner, arranged to determine availability of the input image on the basis of the extracted digital watermarks. In the apparatus, the determiner determines availability of an image process for each of the detected image regions.

It is still another object of the present invention to control a process for image regions of image information.

To achieve this object, a preferred embodiment of the present invention discloses an image processing apparatus comprising: an input section, arranged to input digital image information; a detector, arranged to recognize a predetermined image region included in the input image information; a generator, arranged to generate authentication information required to control a process for the image region; and an embedding section, arranged to embed the authentication information in the image region.

It is still another object of the present invention to protect an image for each image region.

To achieve this object, a preferred embodiment of the present invention discloses an image processing apparatus comprising: an input section, arranged to input digital image information; a detector, arranged to recognize a predetermined image region included in the input image information;

a generator, arranged to generate authentication information required to control a process for the image region; and an embedding section, arranged to embed the authentication information in the image region. In the apparatus, the generator and the embedding section generate and embed the authentication information for each predetermined image region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 14A and 14B show the block selection result;

FIG. 15 is a view for explaining embedding of a document watermark;

FIG. 16 is a view for explaining extraction of a document watermark;

FIG. 21 shows examples of basic matrices;

FIG. 22 shows an example of a digital watermark;

FIG. 23 is a view showing an embedding process of a digital watermark;

FIG. 27 shows examples of extraction patterns;

FIGS. 36 to 38 are views for explaining a method of converting encoded data to bitmap data.

DESCRIPTION OF THE PREFERRED EMBODIMENTS

An image processing apparatus according to embodiments of the present invention will be described in detail hereinafter with reference to the accompanying drawings.

First Embodiment

[Arrangement]

Figure 1:
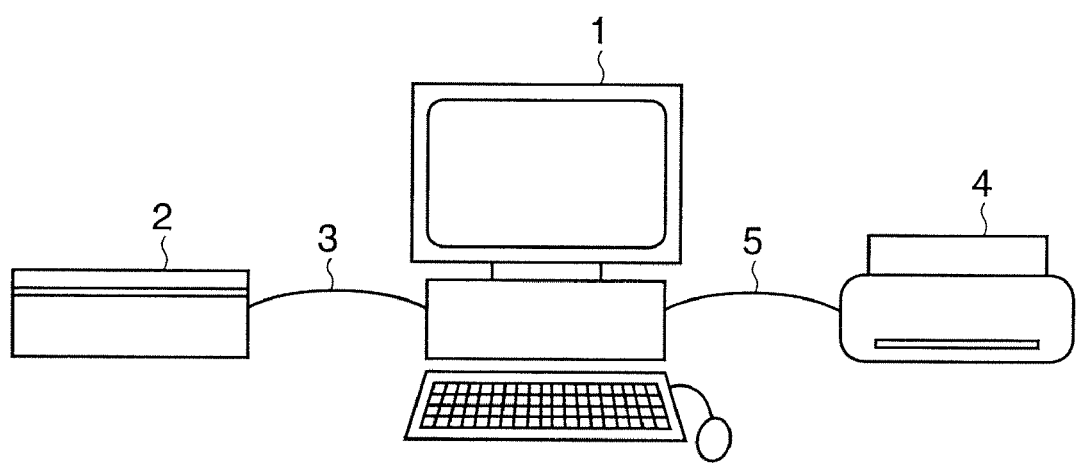
FIG. 1 shows an image processing system according to the first embodiment.

FIG. 1 shows an image processing system according to the first embodiment.

A computer system (personal computer) 1 and an image input apparatus (color image scanner) 2 are connected via a cable 3 used to exchange data between them. Furthermore, the personal computer 1 and an image output apparatus (color printer) 4 are connected via a cable 5 used to exchange data between them.

Figure 2:
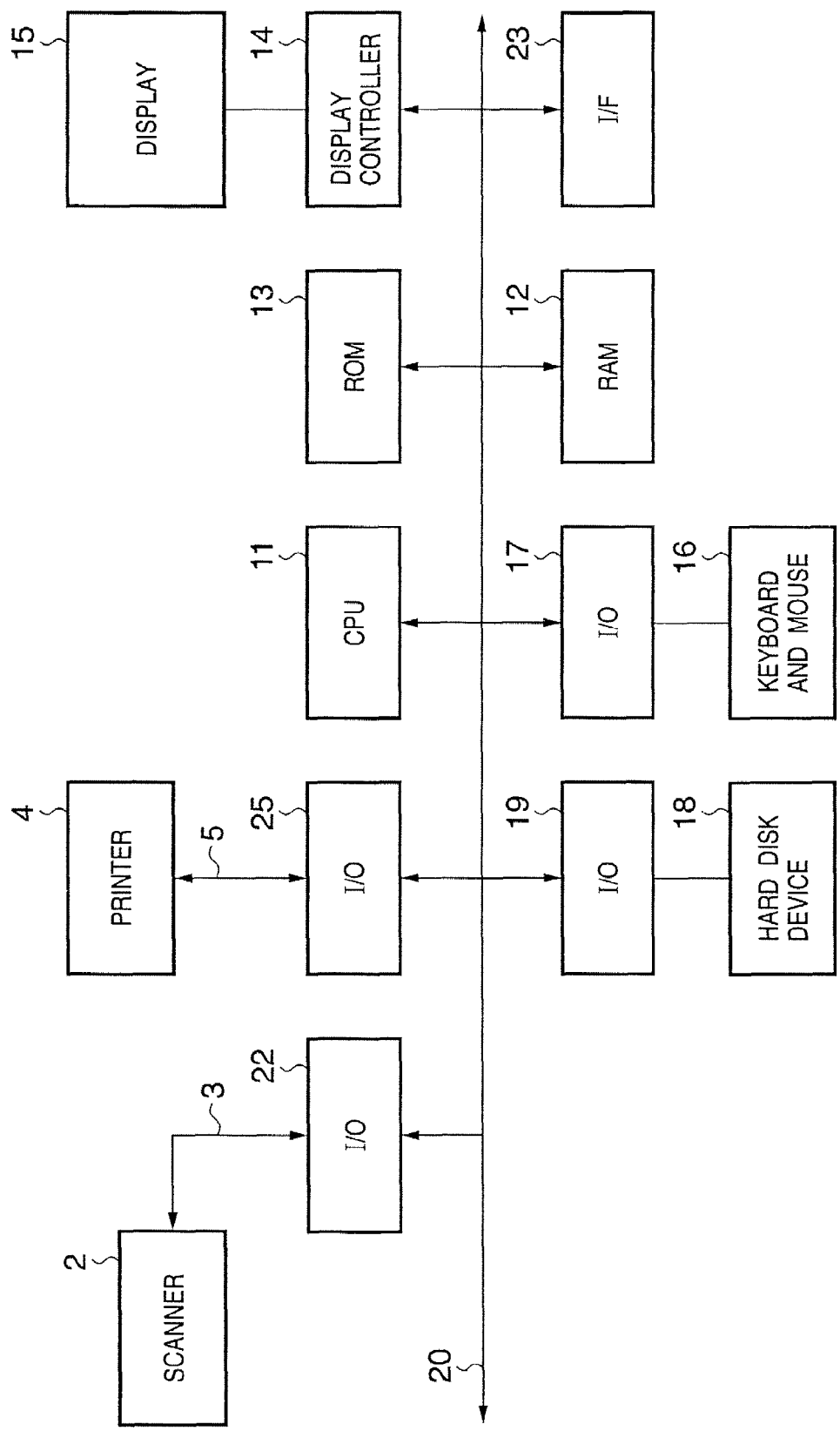
FIG. 2 is a block diagram that expresses principal part of the arrangement shown in FIG. 1 as function modules.

FIG. 2 is a block diagram that expresses principal part of the arrangement shown in FIG. 1 as function modules.

Referring to FIG. 2, a CPU 11 controls operations of other building components via a bus 20 in accordance with a program stored in a ROM 13 or hard disk device 18 using a RAM 12 as a work memory. Furthermore, the CPU 11 controls an I/O 22 for the image input apparatus in accordance with an instruction input from a keyboard and mouse 16 connected to an I/O 17 for an operation input device so as to make the scanner 2 capture an image. The CPU 11 then controls a display controller 14 to display the captured image on a display 15. Or the CPU 11 controls an I/O 19 for an external storage device to store the captured image in the hard disk device 18. Or the CPU 11 outputs the captured image to various networks via an interface (I/F) 23. Of course, an image may be acquired from a server connected to the network via the I/F 23.

As the I/Os for the scanner 2 and printer 4, and also those for the hard disk device 18 and operation input device, a USB (Universal Serial Bus), IEEE1394 serial bus, or the like are suitably used. Also, as the I/O for the printer 4, an IEEE1284 interface may be used.

[Operation]

Figure 3:
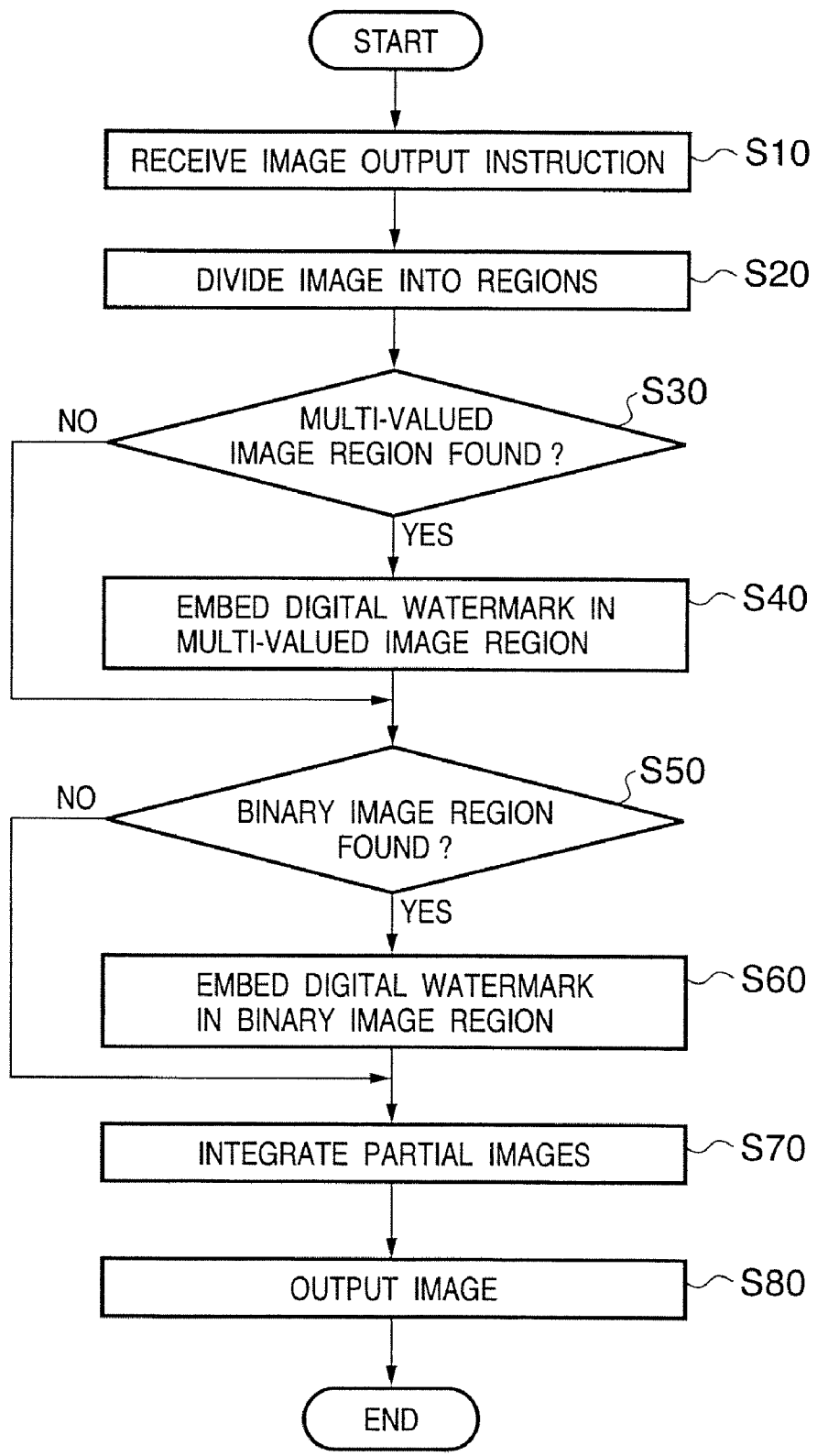
FIG. 3 is a flow chart showing the operation sequence of the first embodiment.

FIG. 3 is a flow chart showing the operation sequence of the first embodiment. A program which describes the sequence shown in FIG. 3 and can be executed by a computer is pre-stored in the ROM 13 or hard disk device 18. The CPU 11 loads that program onto the RAM 12 and executes the loaded program, thus executing operations to be described below.

Upon reception of an image output instruction (S10), the operation shown in FIG. 3 starts. More specifically, when the operator has issued an instruction for printing an image created using image edit process software or the like by the printer 4 by operating the keyboard and mouse 16, the CPU 11 loads image data to be processed from the hard disk device 18 or the like onto the RAM 12 in accordance with this instruction.

Note that an instruction may instruct to print an image that has already been rendered on the RAM 12 by image edit process software or the like. Also, an instruction may instruct to scan an image from a print by the scanner 2 and to print the scanned image. Furthermore, an instruction may instruct to download an image from a server connected to the network, and to print the downloaded image. A detailed description of these processes will be omitted.

The CPU 11 identifies the features of images contained in image data loaded onto the RAM 12, divides the image data into image regions, i.e., a multi-valued image region (including a photo image or the like), and a binary image region (including text, line images, figures/tables, and the like), and writes the division results in a predetermined area on the RAM 12 (S20).

The CPU 11 determines based on the image region division results and image data held in the RAM 12 whether or not the image to be processed includes a multi-valued image region (S30). If YES in step S30, the flow advances to step S40; otherwise, the flow jumps to step S50.

In step S40, the CPU 11 embeds a digital watermark indicating an object to be copyrighted or the like in each multi-valued image region using the method of embedding a digital watermark in the spatial domain or the method of embedding a digital watermark in the frequency domain.

The CPU 11 then determines based on the image region division results and image data held in the RAM 12 whether or not the image to be processed includes a binary image region (S50). If YES in step S50, the flow advances to step S60; otherwise, the flow jumps to step S70.

In step S60, the CPU 11 embeds a digital watermark indicating an object to be copyrighted or the like in each binary image region using the method of manipulating the spaces between neighboring characters or the method of forming a binary image using binary cells (density pattern) each consisting of 2×2 pixels.

The CPU 11 integrates partial images of the multi-valued and binary image regions embedded with the digital watermarks to generate image data corresponding to one page to be printed on the RAM 12 (S70). The CPU 11 then executes processes required upon printing the generated image data by the printer 4 (e.g., a halftone process such as an error diffusion process or the like, gamma correction, conversion into page description language data, and the like), and sends generated print data to the printer 4, thus making the printer 4 print an image (S80).

Note that region division in step S20 can adopt methods disclosed in, e.g., Japanese Patent Laid-Open Nos. 8-186706 and 8-336040. Japanese Patent Laid-Open No. 8-186706 discloses a method of extracting image regions from a digital color data on which image regions having different components (corresponding to partial image regions) are mixed paying special attention to an image region serving as a background (base), and determining if each of these image regions is a color photo, a color character or line image other than black, a monochrome density (gray) photo, a monochrome character or line image, or the like. Also, Japanese Patent Laid-Open No. 8-336040 discloses a method of satisfactorily dividing a digital color image into image regions (region division) at high speed irrespective of the input image size on the basis of the technique described in Japanese Patent Laid-Open No. 8-186706.

In the above embodiment, a digital watermark is embedded in each of partial images of an image which is created in advance using image edit process software or the like. Upon editing each partial image by image edit process software, a feature of that partial image may be identified, and a digital watermark may be embedded in the partial image by an embedding method corresponding to the identification result. In this case, processes corresponding to steps S30 to S70 shown in FIG. 3 may be programmed in image edit process software.

Second Embodiment

An image processing apparatus according to the second embodiment of the present invention will be described below. Note that the same reference numerals in the second embodiment denote substantially the same building components as those in the first embodiment, and a detailed description thereof will be omitted.

Figure 4:
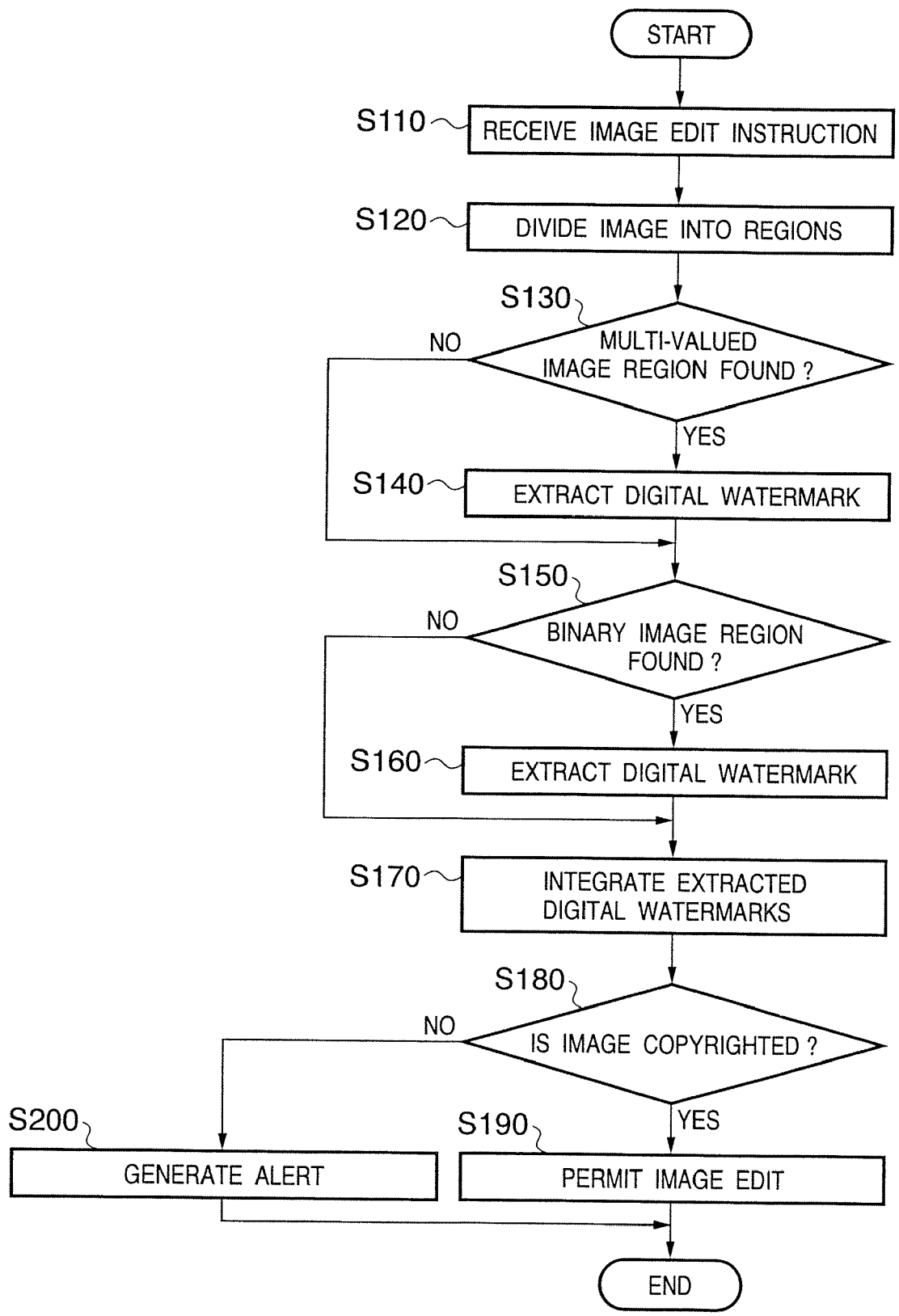
FIG. 4 is a flow chart showing the operation sequence of the second embodiment.
Figure 5:
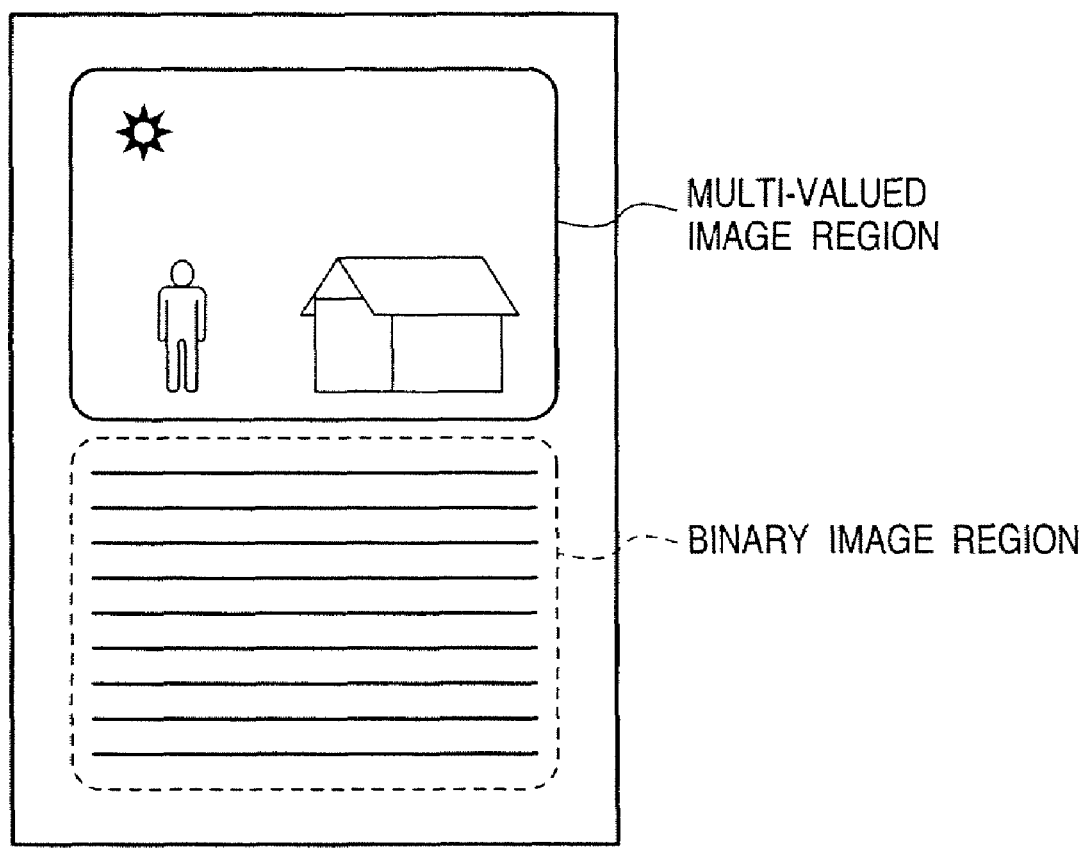
FIGS. 5 and 6 show examples of mixed images.
Figure 6:
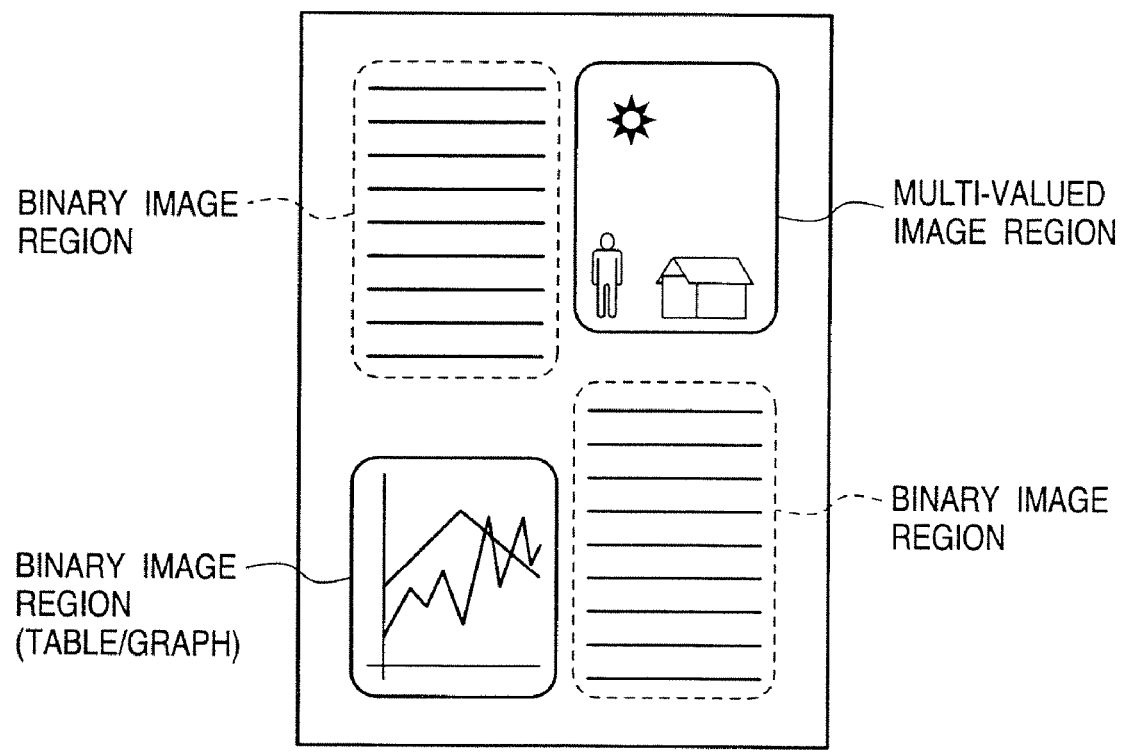

FIG. 4 is a flow chart showing the operation sequence of the second embodiment.

Upon reception of an image output instruction (S110), the operation shown in FIG. 4 starts. More specifically, when the operator has issued an instruction for editing an image scanned from a print or the like by operating the keyboard and mouse 16, the CPU 11 loads image data to be processed from the hard disk device 18 or the like onto the RAM 12 in accordance with this instruction.

As in the first embodiment, an instruction may instruct to edit an image that has already been rendered on the RAM 12 by image edit process software or the like. Also, an instruction may instruct to scan an image from a print by the scanner 2 and to print the scanned image. Furthermore, an instruction may instruct to download an image from a server connected to the network, and to print the downloaded image. A detailed description of these processes will be omitted.

The CPU 11 identifies the features of images contained in image data loaded onto the PAM 12, divides the image data into image regions, i.e., a multi-valued image region (including a photo image or the like), and a binary image region (including text, line images, figures/tables, and the like), and writes the division results in a predetermined area on the RAM 12 (S120).

The CPU 11 determines based on the image region division results and image data held in the PAM 12 whether or not the image to be processed includes a multi-valued image region (S130). If YES in step S130, the flow advances to step S140; otherwise, the flow jumps to step S150.

The CPU 11 checks in step S140 if a digital watermark is embedded in each multi-valued image region of the image data held in the RAM 12. If YES in step S140, the CPU 11 writes that digital watermark in a predetermined area on the PAM 12 for each image region; otherwise, the CPU 11 writes data indicating that no digital watermark is embedded, in the predetermined area.

The CPU 11 then determines based on the image region division results and image data held in the RAM 12 whether or not the image to be processed includes a binary image region (S150). If YES in step S150, the flow advances to step S160; otherwise, the flow jumps to step S170.

The CPU checks in step S160 if a digital watermark is embedded in each binary image region of the image data held in the RAM 12. If YES in step S160, the CPU 11 writes that digital watermark in a predetermined area on the RAM 12 for each image region; otherwise, the CPU 11 writes data indicating that no digital watermark is embedded, in the predetermined area.

The CPU 11 integrates the extracted digital watermarks (S170) and checks if the image designated by the print instruction is an object to be copyrighted or the like (S180). If it is determined that the image itself or its partial image is to be copyrighted or the like, the flow advances to step S200; otherwise, the flow advances to step S190.

In step S190, the CPU 11 allows the user to edit the image. In this manner, the operator can use (clip, edit, print, save, and the like) the desired image. On the other hand, in step S200 the CPU 11 displays a message indicating that the image designated by the print instruction or its partial image is an object to be copyrighted or the like on the display 15 to issue an alert to the operator, thus ending the process.

In the above embodiment, digital watermarks are extracted from respective partial images of an image scanned by the scanner 2. Alternatively, upon editing each partial image by image edit process software, a feature of that partial image may be identified, and a digital watermark which is embedded by an embedding method corresponding to the identification result may be extracted from the partial image. In this case, processes corresponding to steps S130 to S200 shown in FIG. 4 may be programmed in image edit process software.

Furthermore, a digital watermark may be checked for each image region in place of integrating the extracted digital watermarks, and the availability of each image region (partial image) may be determined. Use of a partial image includes a clipping process of a partial image, an edit process of the clipped partial image, a print or save process of the clipped image, and the like.

Third Embodiment

[Arrangement]

Figure 7:
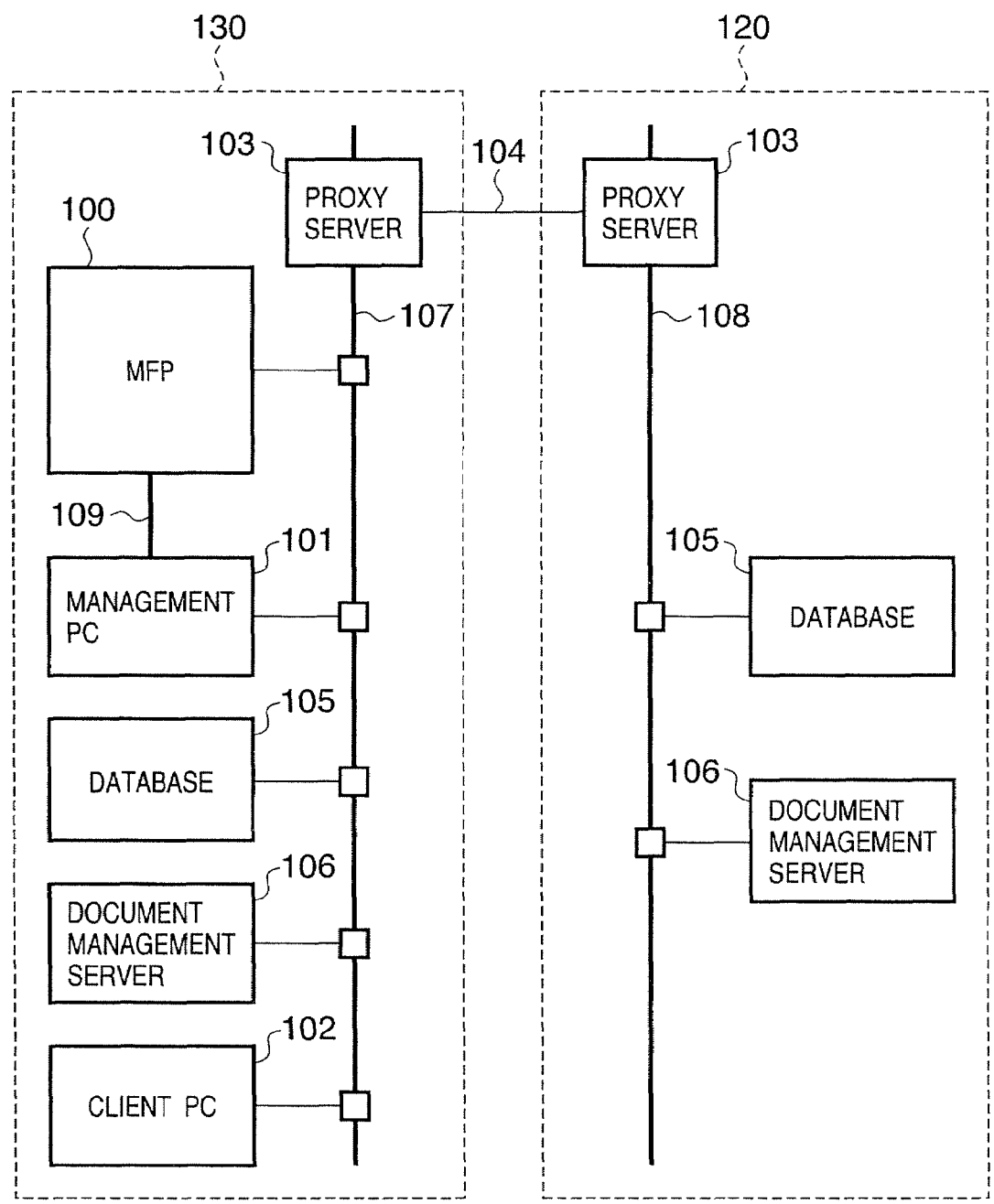
FIG. 7 is a block diagram showing the arrangement of an image processing system according to the third embodiment.

FIG. 7 is a block diagram showing the arrangement of an image processing system according to the third embodiment.

This image processing system is implemented in an environment in which offices (a plurality of sections like offices) 130 and 120 are connected via a WAN 104 (e.g., the Internet).

To a LAN 107 formed in the office 130, an MFP (Multi-Function Processor) 100, a management PC 101 for controlling the MFP 100, a client PC 102, a document management server 106, a database 105 to be managed by the document management server, and the like are connected. The office 120 has substantially the same arrangement as that of the office 130, and at least a document management server 106, a database 105 to be managed by the document management server, and the like are connected to a LAN 108 formed in the office 120. The LANs 107 and 108 of the offices 130 and 120 are interconnected via a proxy server 103 connected to the LAN 107, the WAN 104, and a proxy server 103 connected to the LAN 108.

The MFP 100 has charge of some of image processes for scanning an image on a paper document, and processing the scanned image. An image signal output from the MFP 100 is input to the management PC 101 via a communication line 109. The management PC 101 comprises a general personal computer (PC), which has a memory such as a hard disk or the like for storing an image, an image processor implemented by hardware or software, a monitor such as a CRT, LCD, or the like, and an input unit including a mouse, keyboard, and the like, and some of these units are integrated to the MFP 100.

Figure 8:
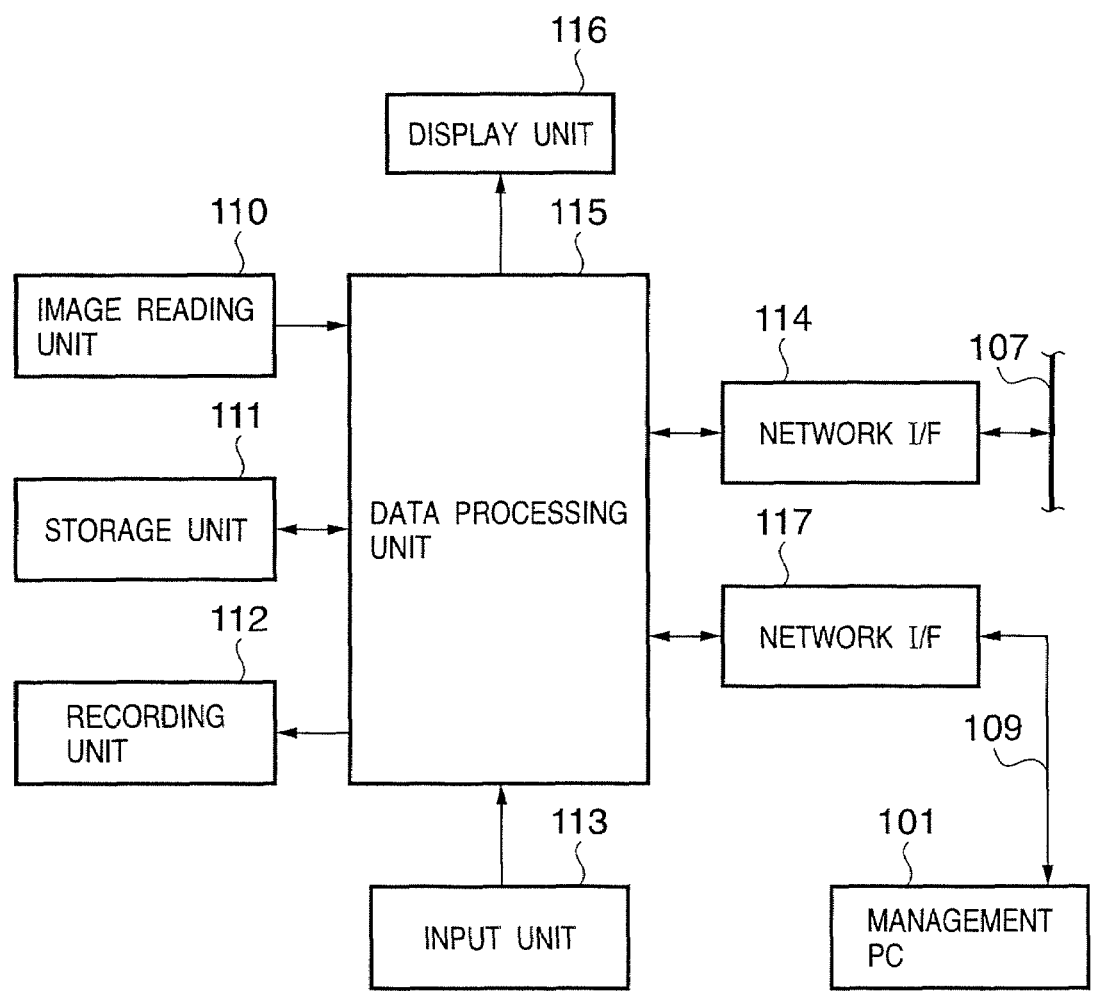
FIG. 8 is a block diagram showing the arrangement of an MFP.
Figure 9:
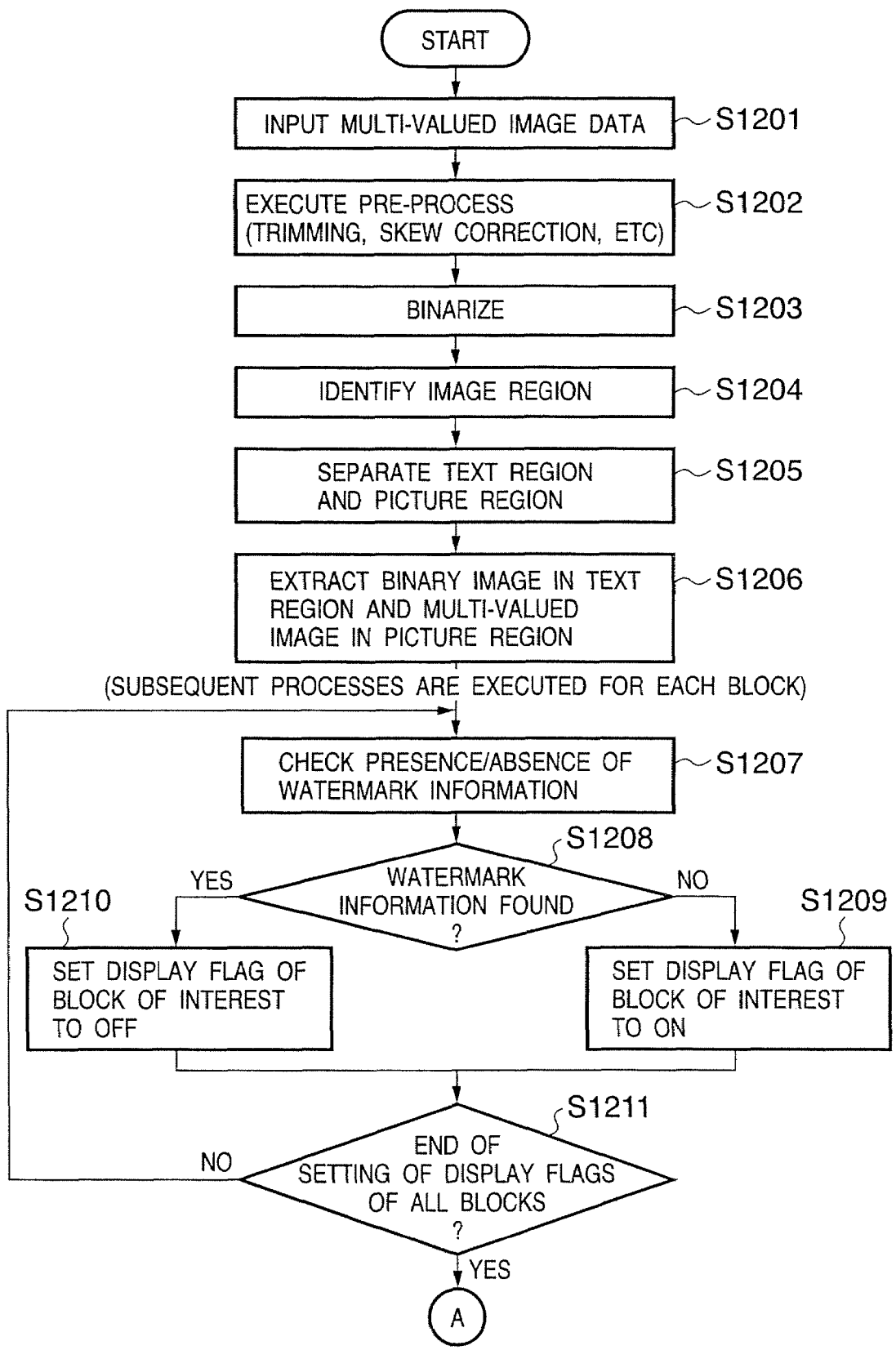
FIGS. 9 to 12 are flow charts for explaining an outline of the processes by the image processing system.
Figure 10:
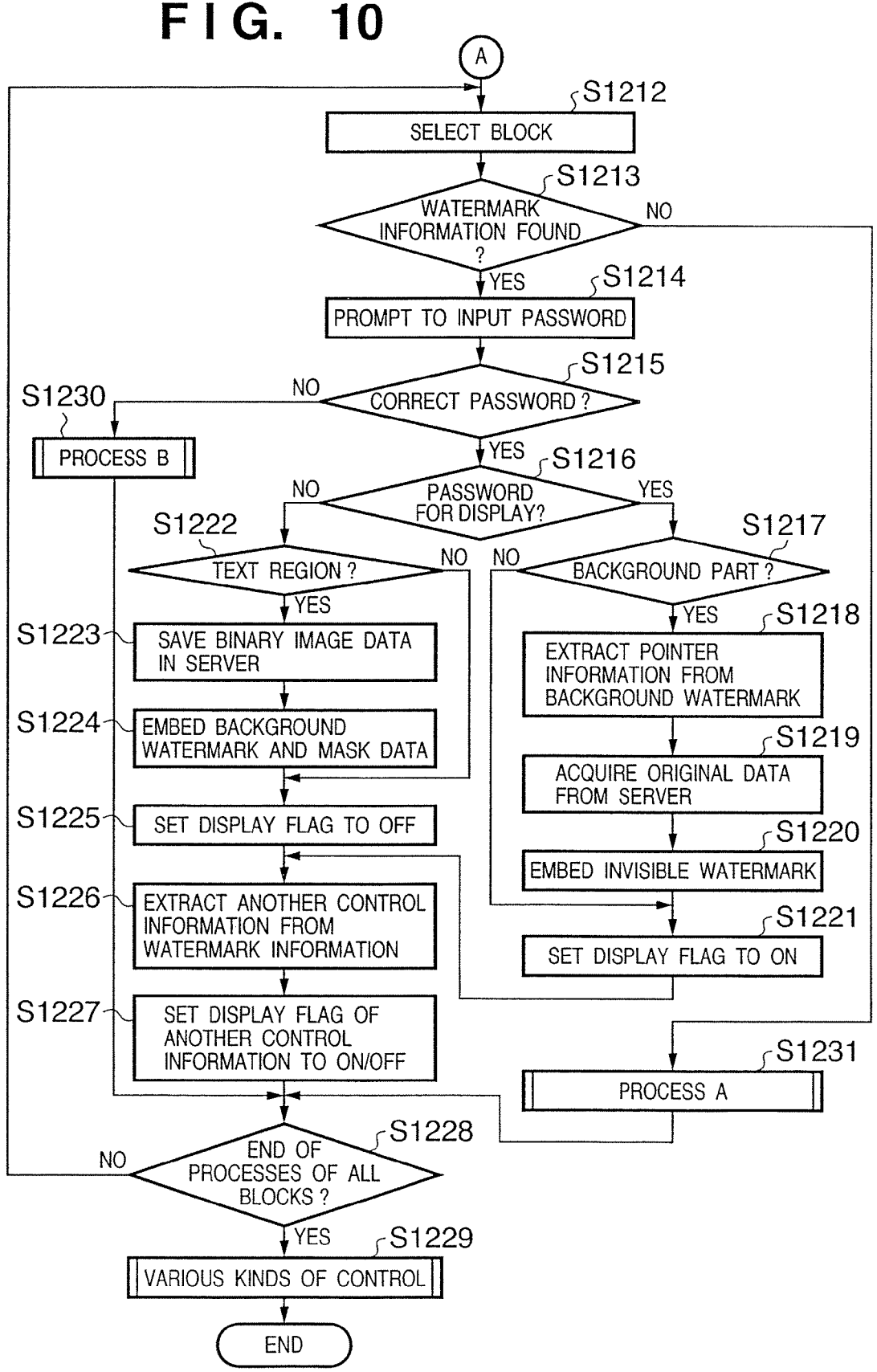
Figure 11:
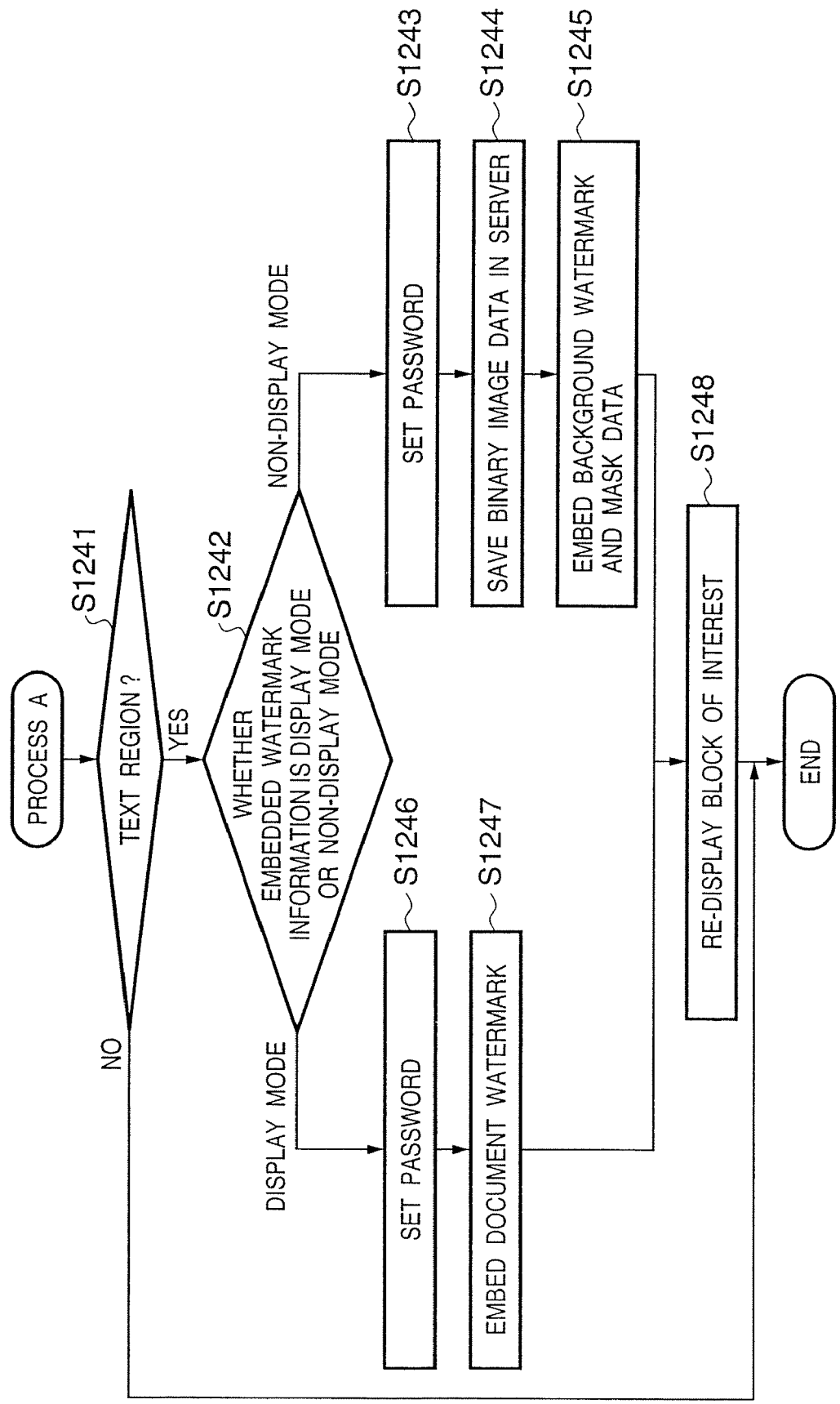
Figure 12:
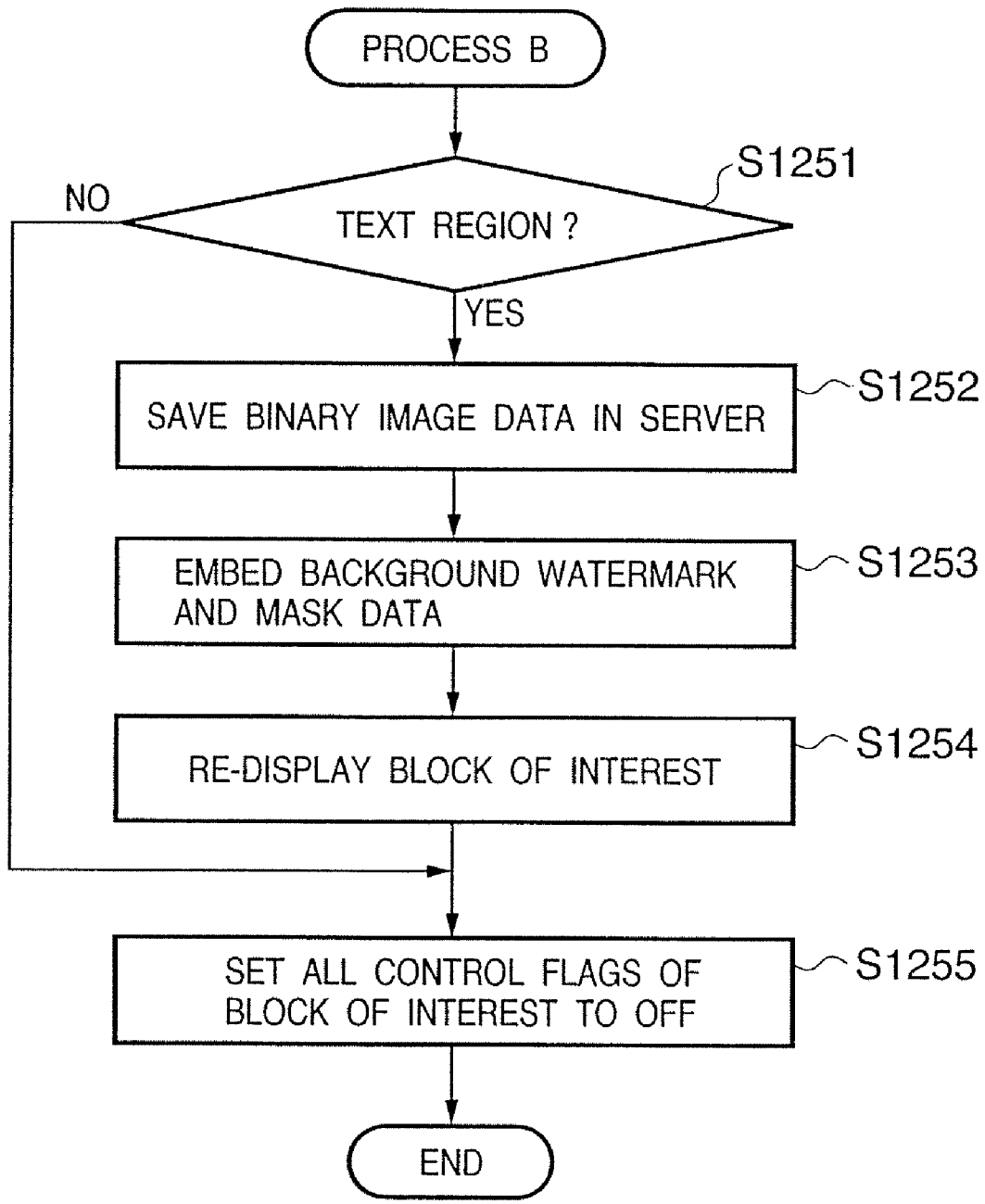

FIG. 8 is a block diagram showing the arrangement of the MEP 100.

An image reading unit 110 including an auto document feeder (ADF) irradiates an image on each of one or a plurality of stacked documents with light coming from a light source, forms an image of light reflected by the document on a solid-state image sensing element via a lens, and obtains a scanned image signal (e.g., 600 dpi) in the raster order from the solid-state image sensing element. Upon copying a document, the scanned image signal is converted into a recording signal by a data processing unit 115. Upon copying a document onto a plurality of recording sheets, a recording signal for one page is temporarily stored in a storage unit 111, and is repetitively output to a recording unit 112, thus forming images on the plurality of recording sheets.

On the other hand, print data output from the client PC 102 is input to a network interface (I/F) 114 via the LAN 107, and is converted into recordable raster data by the data processing unit 115. The raster data is formed as an image on a recording sheet by the recording unit 112.

The operator inputs an instruction to the MFP 100 using a key console equipped on the MEP 100 and an input unit 113 including a keyboard and mouse of the management PC 101. A display unit 116 displays an operation input and image process status.

The operation of the MFP 100 is controlled by a controller (not shown) in the data processing unit 115.

Note that the storage unit 111 can also be controlled from the management PC 101. Data exchange and control between the MFP 100 and management PC 101 are done via a network I/F 117 and a signal line 109 that directly couples them.

[Process]

FIGS. 9 to 12 are flow charts for explaining an outline of the processes by the aforementioned image processing system.

The image reading unit 110 scans a document to obtain a 600-dpi, 8-bit image signal (image information input process, S1201). The data processing unit 115 executes pre-processes such as trimming, skew correction (including correction of a direction), noise removal, and the like for the image signal (S1202), generates a binary image by a binarization process (S1203), and saves image data (multi-valued and binary image data) for one page in the storage unit 111.

A CPU of the management PC 101 executes block selection for the image data stored in the storage unit 111 to identify a text/line image part, halftone image part, and background part where neither a text/line image nor an image are present (S1204) Furthermore, the CPU divides the text/line image part into regions (text regions) for respective paragraphs and other structures (a table or line image having ruled lines). On the other hand, the CPU divides the halftone image part and background part into independent objects (picture regions) for respective minimum division units such as rectangular regions and the like (S1205). Then, the CPU extracts a binary image for each text region and a multi-valued image for each picture region from the image data stored in the storage unit 111 on the basis of the position information of the divided (detected) text and picture regions (S1206). In the following description, the extracted image region will also be referred to as a "block".

The following processes are done for each block. Whether or not watermark information is embedded in the block to be processed is determined by a document watermark detection process when the block to be processed is a text region or a background watermark detection process when it is a picture region (S1207). If it is determined that watermark information is embedded, a display flag of the region of interest is set to OFF (S1210); otherwise, a display flag of the region of interest is set to ON (S1209). It is then checked if the same process has been done for all blocks (S1211). The processes in steps S1207 to S1210 are repeated until the display flags of all the blocks are set.

Subsequently, a block to be processed is selected (S1212), and it is checked based on the display flag if watermark information is embedded in the selected block (S1213). If no watermark information is embedded, the flow jumps to "process A" to be described later. On the other hand, if watermark information is embedded, the control prompts the operator to input a password (S1214). This password is used to control display of the block of interest, and to authenticate other control functions such as print, send, and the like, as will be described later.

If a password is input, its authenticity is checked (S1215). If a wrong password is input, the flow advances to "process B" to be described later. If a correct password is input, it is checked if that password is a display password (S1216). If YES in step S1216, it is further checked if the block of interest corresponds to the background part (S1217). If the block of interest corresponds to a part (text region or halftone image part) other than the background part, the display flag of that block is set to ON (S1221).

If it is determined in step S1217 that the block of interest corresponds to the background part, i.e., the background part embedded with watermark information, since that part includes no image, pointer information indicating the storage location of original data of an image is extracted from the watermark information (to be referred to as a "background watermark" hereinafter) embedded in the background (S1218), and the original data is acquired from the document management server 106 or the like (S1219). In this case, if no watermark information is embedded in original data, succession of the watermark information is required. If the original data does not succeed any watermark information, various kinds of control of the block of interest are disabled. Alternatively, new watermark information may be input in place of succession. The original data of the block of interest succeeds the watermark information (e.g., background watermark information is embedded in an image as an invisible watermark) or new watermark information is embedded in the original data (S1220) to prepare for a display image embedded with the watermark information. After that, the display flag of the block of interest is set to ON (S1221).

On the other hand, if it is determined in step S1216 that the password is not a display password, it is checked if the block of interest is a text region (S1222). If NO in step S1222, the flow jumps to step S1225. If YES in step S1222, binary image data of the block of interest is sent to and saved in the document management server 106 or the like (S1223), and watermark information (including pointer information indicating the storage location of image data, various passwords, various kinds of control information, and the like) is embedded as a background watermark to mask the block of interest (S1224). In step S1225, the display flag of the block of interest is set to ON.

Other kinds of control information (availability of charge, print, copy, send, and the like) of the block of interest are extracted from the watermark information (S1226), and other control flags are set ON or OFF in accordance with the control information (S1227). It is then determined whether or not the processes of all blocks are complete (S1228). If NO In step S1228, the flow returns to step S1212; otherwise, various kinds of controls are made in accordance with the control flags (1229). Note that a charge flag, print flag, copy flag, send flag, and the like corresponding to control information of charge, print, copy, send, and the like are prepared. If these flags are ON, image data of the block of interest is printed, copied, or transmitted; if these flags are OFF, image data of the block of interest is not printed, copied, or transmitted.

"Process A" to be executed when it is determined in step S1213 that no watermark information is embedded will be explained below.

It is checked if the block of interest is a text region (S1241). If NO in step S1241, since the block of interest is not the one to be controlled, the flow advances to step S1228. On the other hand, if YES in step S1241, a watermark embedding mode is set to prompt the user to select whether a document watermark that allows to read text is embedded (display mode) or a background watermark is embedded to mask the block of interest (non-display mode) (S1242). If the user has selected the display mode, various passwords are set (S1246), and watermark information containing these passwords is embedded as a document watermark (S1247). On the other hand, if the user has selected the non-display mode, various passwords are set (S1243), and binary image data of the block of interest is sent to and saved in the document management server 106 or the like (S1244). Then, a background watermark that contains pointer information, various passwords, various kinds of control information, and the like is embedded to mask the block of interest (S1245).

The image (the image after the watermark information is embedded or background) of the block of interest is re-displayed (S1248), and the flow advances to step S1228.

"Process B" to be executed when it is determined in step S1215 that a wrong password is input will be described below.

It is checked if the block of interest is a text region (S1251). If the block of interest is not a text region (security about display is maintained since that region is originally masked), all control flags are set to OFF to maintain security about control (S1255), and the flow advances to step S1228. If the block of interest is a text region, binary image data of the block of interest is sent to and saved in the document management server 106 or the like (S1252) so as not to display that block. A background watermark containing pointer information of the storage location, various passwords, various kinds of control information, and the like is embedded to mask the block of interest (S1253), and the block of interest is re-displayed (S1254). Then, all control flags are set to OFF (S1255), and the flow advances to step S1228.

As an example of various kinds of control, print and send limitations will be explained below.

Upon receiving a print instruction, a block with an OFF print flag: a background image embedded with a background watermark is printed; or a block with an ON print flag: an image embedded with a document watermark or an image of original data is printed.

Upon receiving a send instruction, a block with an OFF send flag: a background image embedded with a background watermark is transmitted; or a block with an ON send flag: an image embedded with a document watermark or original data is transmitted.

With this control, security can be freely managed (e.g., to impose a browse limitation, copy limitation, send limitation, print limitation, to charge for reuse and the like) for each object of a document. Upon printing a document, since a document watermark and invisible watermark are respectively embedded in a text region and picture region, security management of objects scanned from a printed image can be implemented, thus greatly improving the document security.

Principal processes will be described in more detail below.

[Block Selection]

Block selection in steps S1204 and S1205 will be explained first.

Figure 13:
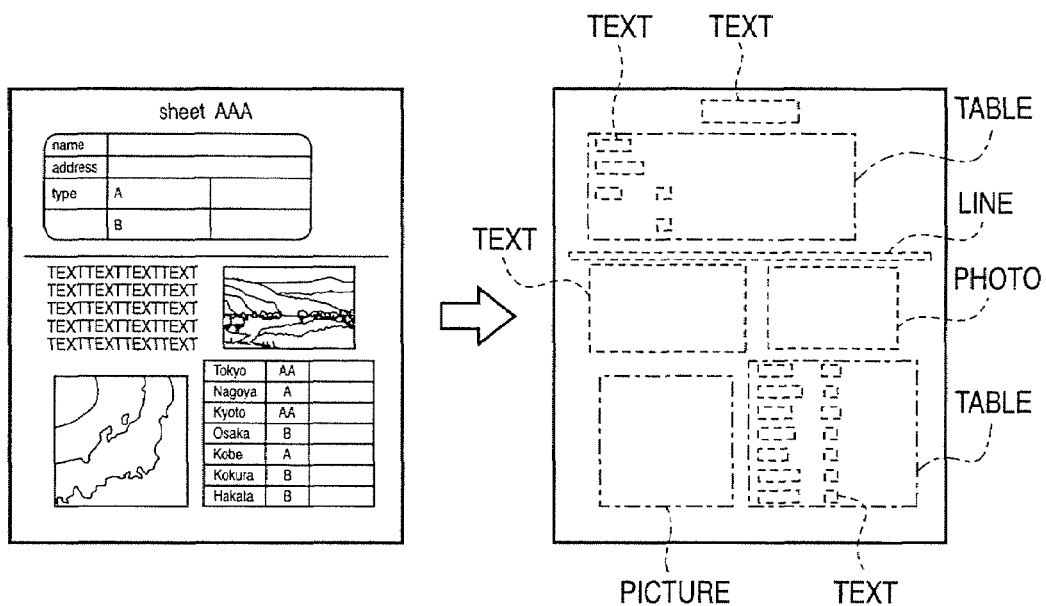
FIG. 13 is a view for explaining block selection.

Block selection is a process for recognizing an image for one page shown in FIG. 13 as a set of objects, determining the property of each object to TEXT, PICTURE, PHOTO, LINE, or TABLE, and dividing the image into regions (blocks) having different properties. An example of block selection will be explained below.

An image to be processed is binarized to a monochrome image, and a cluster of pixels bounded by black pixels is extracted by contour tracing. For a cluster of black pixels with a large area, contour tracing is made for white pixels in the cluster to extract clusters of white pixels. Furthermore, a cluster of black pixels in the cluster of white pixels with a predetermined area or more is extracted. In this way, extraction of clusters of black and white pixels are recursively repeated.

The obtained pixel clusters are classified into regions having different properties in accordance with their sizes and shapes. For example, a pixel cluster which has an aspect ratio close to 1, and has a size that falls within a predetermined range is determined as that of a text property. Furthermore, when neighboring pixel clusters with a text property line up and can be grouped, they are determined as a text region. Also, a low-profile pixel cluster with a small aspect ratio is categorized as a line region, a range occupied by black pixel clusters that include white pixel clusters which have a shape close to a rectangle and line up is categorized as a table region, a region where pixel clusters with indeterminate forms are distributed is categorized as a photo region, and other pixel clusters with an arbitrary shape is categorized as a picture region.

FIGS. 14A and 14B show the block selection results. FIG. 14A shows block information of each of extracted blocks. FIG. 14B shows input file information and indicates the total number of blocks extracted by block selection. These pieces of information are used upon embedding or extracting watermark information.

[Embedding Process of Document Watermark]

The embedding process of a document watermark will be explained below.

A document image 3001 shown in FIG. 15 is a block separated as a text region by block selection. Furthermore, circumscribing rectangles 3004 for respective text elements are extracted from the text region by a document image analysis process 3002. A text element indicates a rectangular region extracted using projection, and corresponds to either one character or a building component (radical or the like) of a character.

The space lengths between neighboring circumscribing rectangles are calculated on the basis of information of the extracted circumscribing rectangles 3004, and respective circumscribing rectangles are shifted to the right or left on the basis of embedding rules to be described later to embed 1-bit information between neighboring circumscribing rectangles (embedding process 3003), thereby generating a document image 3005 embedded with watermark information 3006.

The document image analysis process 3002 is an element technique of character recognition, and is a technique for dividing a document image into a text region, a figure region such as a graph or the like, and the like, and extracting respective characters one by one in the text region using projection. For example, a technique described in Japanese Patent Laid-Open No. 6-68301 may be adopted.

[Extraction Process of Document Watermark]

The extraction method of a document watermark will be explained below.

As in the document watermark embedding process, circumscribing rectangles 3103 of characters are extracted from an image 3005 shown in FIG. 16 by block selection and a document image analysis process 3002, and the space lengths between neighboring circumscribing rectangles are calculated on the basis of information of the extracted circumscribing rectangles 3103. In each line, a character used to embed 1-bit information is specified, and embedded watermark information 3105 is extracted on the basis of the embedding rules to be described later (extraction process 3104).

The embedding rules will be explained below.

Figure 17:
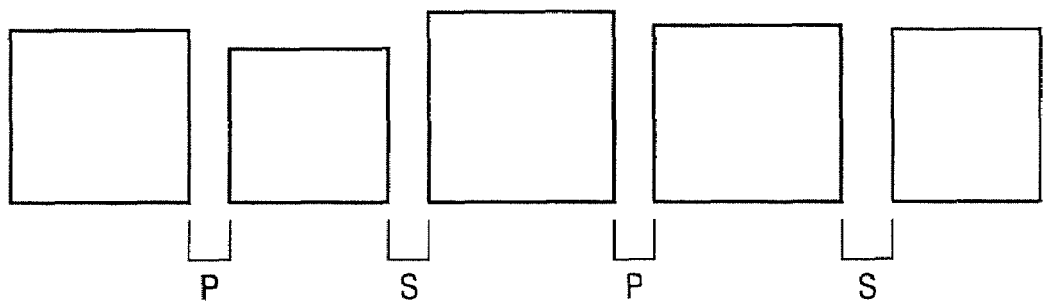
FIG. 17 is a view for explaining the embedding rule of a document watermark.

Let P and S be the space lengths before and after a character where 1-bit information is embedded, as shown in FIG. 17. One-bit information is embedded in every other characters except for the two end characters of a line. (P−S)/(P+S) is calculated from the space lengths, and the result is quantized by an appropriate quantization step to calculate the remainder, thus reconstructing 1-bit information. Equation (1) represents this relationship, and can extract an embedded value V ('0' or '1').

$$V=\text{floor}[(P-S)/\{\alpha(P+S)\}] \bmod 2 \quad (1)$$

where $\alpha$ is the quantization step ($0<\alpha<1$).

Upon embedding watermark information, a circumscribing rectangle is shifted to the right or left pixel by pixel, and a shift amount (the number of pixels) to the left or right is increased until a value ('0' or '1') is obtained by equation (1).

Figure 18:
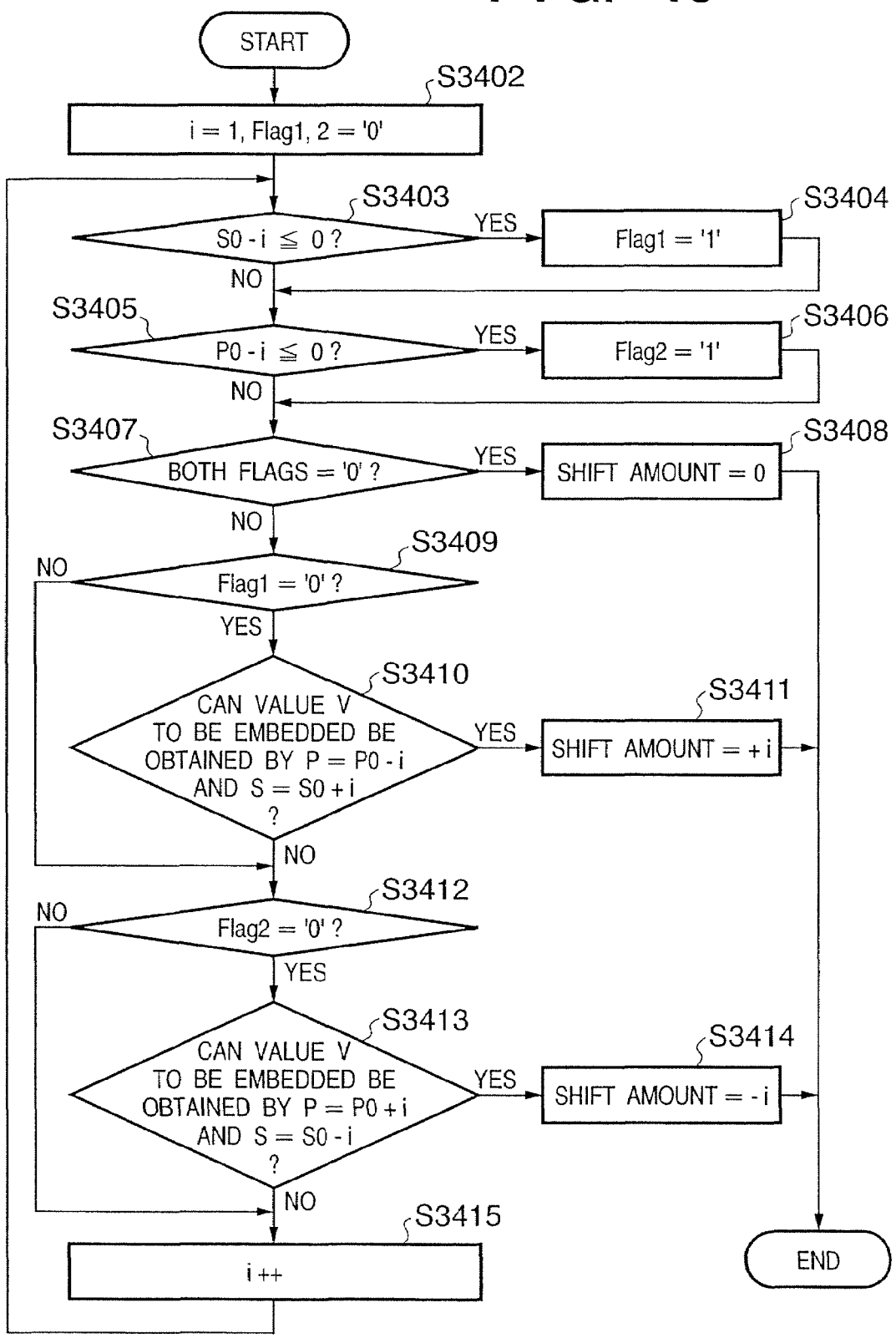
FIG. 18 is a flow chart showing the process for exploring a shift amount.

FIG. 18 is a flow chart showing the process for exploring the shift amount. In FIG. 18, variable i indicates a candidate value of the shift amount, and variables Flag1 and Flag2 indicate whether or not a character to be shifted touches a neighboring character if it is shifted distance i to the right or left. If the character to be shifted touches a neighboring character, variable Flag1 or Flag2 assumes '1'.

Initial values of variables are set (S3402), and it is determined whether or not a character (or character element) to be shifted touches a right neighboring character (or character element) if it is shifted distance i to the right (S3403). If YES in step S3403, Flag1 is set to '1' (S3404). Subsequently, it is determined whether or not the character to be shifted touches a left neighboring character if it is shifted distance i to the left (S3405). If YES in step S3405, Flag2 is set to '1' (S3406).

It is then checked if it is possible to shift the character distance i (S3407). If both the flags are '1', it is determined that it is impossible to shift the character, and the shift amount is set to zero (S3408). In this case, it is impossible to embed information by shifting the character to be shifted.

If Flag1='0' (S3409), whether or not value V to be embedded is obtained by shifting the character to be shifted distance i to the right is determined using equation (1) (S3410). If YES in step S3410, the shift amount is set to +i (S3411). Note that a positive sign of the shift amount indicates right shift, and a negative sign indicates left shift.

If Flag1='1', or if value V cannot be obtained by right shift and Flag2='0' (S3412), whether or not value V to be embedded is obtained by shifting the character to be shifted distance i to the left is determined using equation (1) (S3413). If YES in step S3413, the shift amount is set to −i (S3414).

If neither right shift nor left shift can yield value V, variable i is incremented (S3415), and the flow returns to step S3403.

A character is shifted in accordance with the shift amount explored in this way, thus embedding 1-bit information. By repeating the aforementioned process for respective characters, watermark information is embedded in a document image.

[Digital Watermark Embedding Processor]

A digital watermark to be described below is also called an "invisible digital watermark", and is a change itself in original image data as small as a person can hardly perceive. One or a combination of such changes represent arbitrary additional information.

Figure 19:
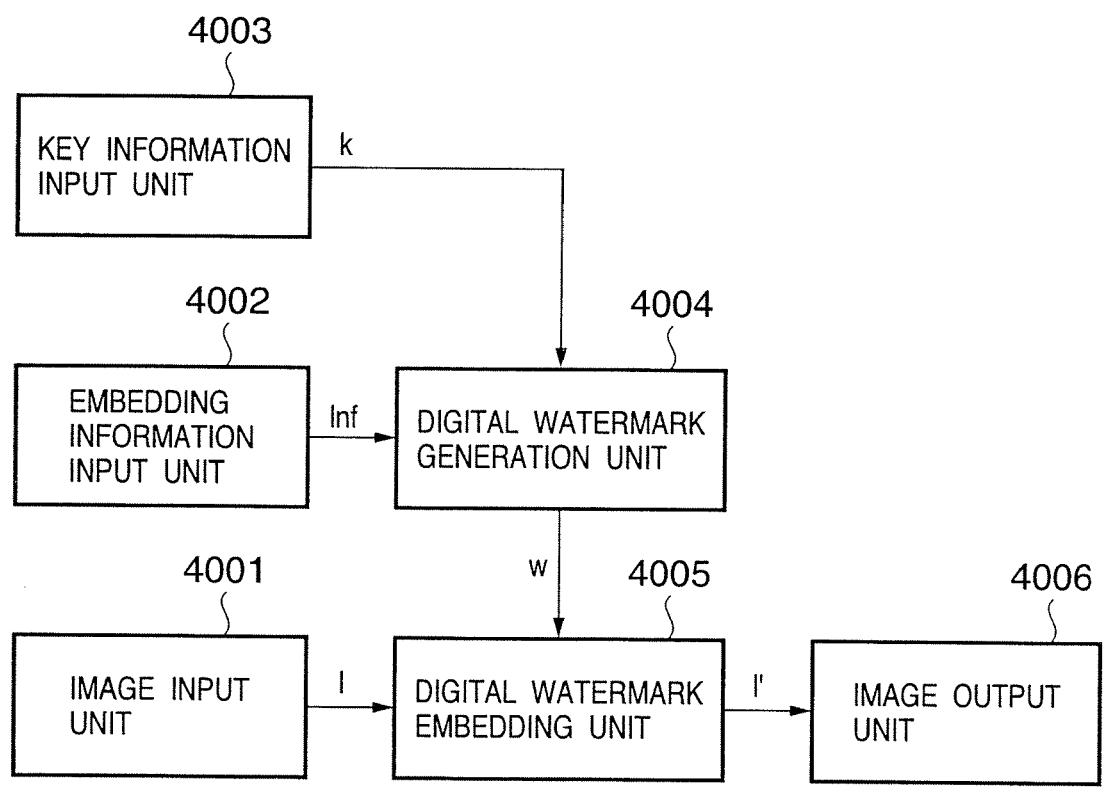
FIG. 19 is a block diagram showing the arrangement of an embedding processor (function module) for embedding watermark information.

FIG. 19 is a block diagram showing the arrangement of an embedding processor (function module) for embedding watermark information.

The embedding processor comprises an image input unit 4001, embedding information input unit 4002, key information input unit 4003, digital watermark generation unit 4004, digital watermark embedding unit 4005, and image output unit 4006. Note that the digital watermark embedding process may be implemented by software with the above arrangement.

The image input unit 4001 inputs image data I of an image in which watermark information is to be embedded. In the following description, assume that image data I represents a monochrome multi-valued image for the sake of simplicity. Of course, when watermark information is embedded in image data such as color image data consisting of a plurality of color components, each of R, G, and B components or luminance and color difference components as the plurality of color components is handled in the same manner as a monochrome multi-valued image, and watermark information can be embedded in each component. In this case, watermark information with an information size three times that of a monochrome multi-valued image can be embedded.

The embedding information input unit 4002 inputs watermark information to be embedded in image data I as a binary data sequence. This binary data sequence will be referred to as additional information Inf hereinafter. Additional information Inf is formed of a combination of bits each of which indicates either '0' or '1'. Additional information Inf represents authentication information used to control a region corresponding to image data I, pointer information to original data, or the like. A case will be exemplified below wherein additional information Inf expressed by n bits is to be embedded.

Note that additional information Inf may be encrypted not to be readily misused. Also, additional information Inf may undergo error correction coding so as to correctly extract additional information Inf even when image data I has been changed (to be referred to as "attack" hereinafter) so as not to extract additional information I from it. Note that some attacks may be not deliberate. For example, watermark information may be removed as a result of general image processes such as irreversible compression, luminance correction, geometric transformation, filtering, and the like. Since processes such as encryption, error correction coding, and the like are known to those who are skilled in the art, a detailed description thereof will be omitted.

The key information input unit 4003 inputs key information k required to embed and extract additional information Inf. Key information k is expressed by L bits, and is, e.g., "01010101" ("85" in decimal notation) if L=8. Key information k is given as an initial value of a pseudo random number generation process executed by a pseudo random number generator 4102 (to be described later). As long as the embedding processor and an extraction processor (to be described later) use common key information k, embedded additional information Inf can be correctly extracted. In other words, only a user who possesses key information k can correctly extract additional information Inf.

The digital watermark generation unit 4004 receives additional information Inf from the embedding information input unit 4002, and key information k from the key information input unit 4003, and generates digital watermark w on the basis of additional information Inf and key information k.

Figure 20:
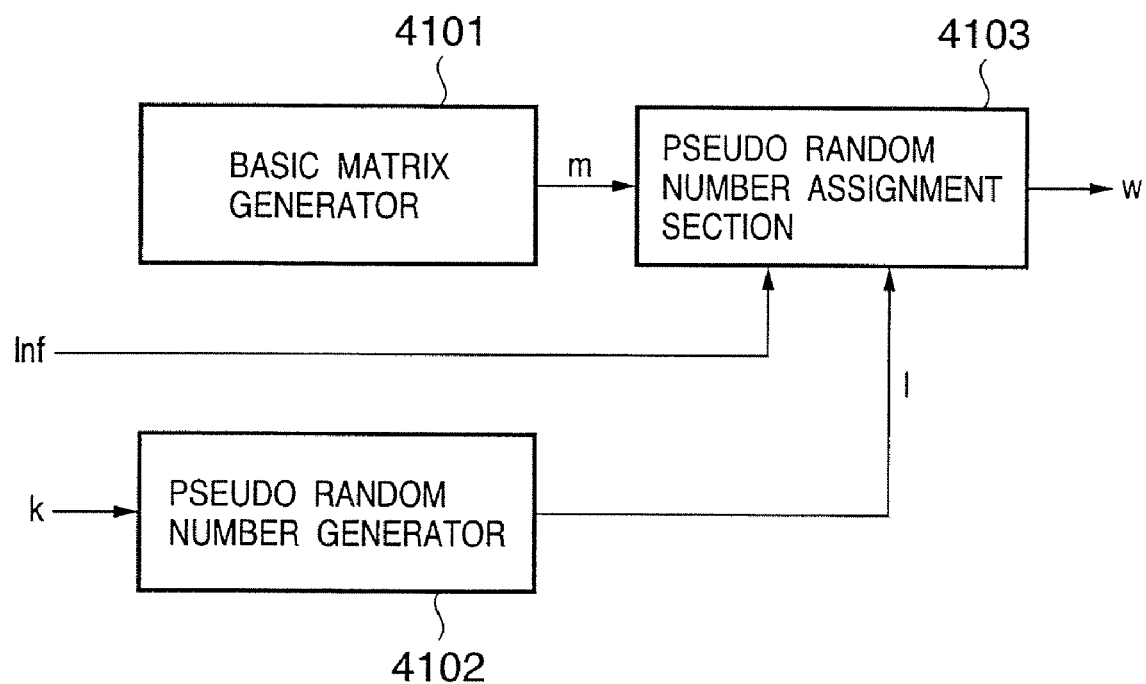
FIG. 20 is a block diagram showing details of a digital watermark generator.

FIG. 20 is a block diagram showing details of the digital watermark generation unit 4004.

A basic matrix generator 4101 generates basic matrix m. Basic matrix m is used to specify correspondence between the positions of bits which form additional information Inf, and the pixel positions of image data I where respective bits are to be embedded. The basic matrix generator 4101 can selectively use a plurality of basic matrices, and a basic matrix to be used must be changed in correspondence with the purpose intended/situation. By switching a basic matrix, optimal watermark information (additional information Inf) can be embedded.

FIG. 21 shows examples of basic matrices m. A matrix 4201 is an example of basic matrix m used upon embedding 16-bit additional information Inf, and numerals ranging from 1 to 16 are assigned to 4×4 elements. The values of elements of basic matrix m correspond to the bit positions of additional information Inf. That is, bit position "1" (most significant bit) of additional information Inf corresponds to a position where the value of an element of basic matrix m is "1" and, likewise, bit position "2" (bit next to the most significant bit) of additional information Inf corresponds to a position where the value of an element of basic matrix m is "2".

A matrix 4202 is an example of basic matrix m used upon embedding 8-bit additional information Inf. According to the matrix 4202, 8 bits of additional information Inf correspond to elements having values ranging from "1" to "8" of those of the matrix 4201, and no bit positions of additional information Inf correspond to elements which do not have any value. As shown in the matrix 4202, by scattering positions corresponding to respective bits of additional information Inf, a change in image (image quality deterioration) upon embedding additional information Inf can be harder to recognize than the matrix 4201.

A matrix 4203 is another example of basic matrix m used upon embedding 8-bit additional information Inf as in the matrix 4202. According to the matrix 4202, 1-bit information is embedded in one pixel. However, according to the matrix 4203, 1-bit information is embedded in two pixels. In other words, the matrix 4202 uses 50% of all pixels to embed additional information Inf, while the matrix 4203 uses all pixels (100%) to embed additional information Inf. Hence, when the matrix 4203 is used, the number of times of embedding additional information Inf is increased, and additional information Inf can be extracted more reliably (higher robustness against attacks is obtained) than the matrices 4201 and 4202. Note that the ratio of pixels used to embed watermark information will be referred to as a "filling ratio" hereinafter. Note that the filling ratio of the matrix 4201 is 100%, that of the matrix 4202 is 50%, and that of the matrix 4203 is 100%.

A matrix 4202 can embed only 4-bit additional information Inf although it has a filling ratio of 100%. Hence, 1-bit information is embedded using four pixels, and the number of times of embedding additional information Inf is further increased to further improve the robustness against attacks, but the information size that can be embedded becomes smaller than other matrices.

In this manner, by selecting the configuration of basic matrix m, the filling ratio, the number of pixels to be used to embed 1 bit, and the information size that can be embedded can be selectively set. The filling ratio influences the image quality of an image in which watermark information is embedded, and the number of pixels used to embed 1 bit mainly influences the robustness against attacks. Therefore, the image quality deterioration is emphasized with increasing filling ratio. Also, the robustness against attacks becomes higher and the information size that can be embedded decreases with increasing number of pixels used to embed 1 bit. In this manner, the image quality, robustness against attacks, and information size have a trade-off relationship.

In the third embodiment, the robustness against attacks, image quality, and information size can be controlled and set by adaptively selecting a plurality of types of basic matrices m.

The pseudo random number generator 4102 generates pseudo random number sequence r on the basis of input key information k. Pseudo random number sequence r is a real number sequence according to a uniform distribution included within the range {−1, 1}, and key information k is used as an initial value upon generating pseudo random number sequence r. That is, pseudo random number sequence r (k1) generated using key information k1 is different from pseudo random number sequence r (k2) generated using key information k2 (≠k1). Since a method of generating pseudo random number sequence r is known to those who are skilled in the art, a detailed description thereof will be omitted.

A pseudo random number assignment section 4103 receives watermark information Inf, basic matrix m, and pseudo random number sequence r, and assigns respective bits of watermark information Inf to respective elements of pseudo random number sequence r on the basis of basic matrix m, thus generating digital watermark w. More specifically, respective elements of a matrix 4204 are scanned in the raster order to assign the most significant bit to an element having value "1", the second most significant bit to an element having value "2", and so forth. If a given bit of additional information Inf is '1', the corresponding element of pseudo random number sequence r is left unchanged; if it is '0', the corresponding element of pseudo random number sequence r is multiplied by −1. By repeating the aforementioned process for n bits of additional information Inf, digital watermark w exemplified in FIG. 22 is obtained. Note that digital watermark w shown in FIG. 22 is generated when, for example, basic matrix m is the matrix 4204 shown in FIG. 21, the pseudo random number sequence is r={0.7, −0.6, −0.9, 0.8}, and additional information Inf (4 bits) is "1001".

In the above example, 4×4 basic matrices m are used to embed additional information Inf each consisting of 16 bits, 8 bits, and 4 bits. However, the present invention is not limited to such specific example. For example, more pixels may be used to 1-bit information, and basic matrix m with a larger size may be used. If basic matrix m with a larger size is used, pseudo random number sequence r uses a longer real number sequence. In practice, the aforementioned random number sequence which consists of four elements may disturb a normal function of an extraction process (to be described later). That is, although additional information Inf is embedded, correlation coefficients between integrated image c and digital watermarks w1, w2, . . . , wn may become small. Hence, in order to embed, e.g., 64-bit additional information, 256×256 basic matrix m is used at a filling ratio of 50%. In this case, 512 pixels are used to embed 1 bit.

The digital watermark embedding unit 4005 receives image data I and digital watermark w, and outputs image data I' embedded with digital watermark w. The digital watermark embedding unit 4005 executes a digital watermark embedding process according to:

$$I'_{i,j} = I_{i,j} + aw_{i,j} \quad (2)$$

where $I'_{i,j}$ is the image data embedded with the digital watermark, $I_{i,j}$ is the image data before the digital watermark is embedded, $w_{i,j}$ is the digital watermark, i and j are x- and y-coordinate values of the image or digital watermark, and a is a parameter for setting the strength of the digital watermark.

As parameter a, for example, a value around "10" may be selected. By increasing a, a digital watermark with higher robustness against attacks can be embedded, but image quality deterioration becomes larger. On the other hand, by decreasing a, the robustness against attacks is decreased, but image quality deterioration can be suppressed. As in the configuration of basic matrix m, the balance between the robustness against attacks and image quality can be adjusted by appropriately setting the value a.

FIG. 23 shows the digital watermark embedding process given by equation (2) above in detail. Reference numeral 4401 denotes image data I' embedded with the digital watermark; 4402, image data I before the digital watermark is embedded; and 4403, digital watermark w. As shown in FIG. 23, arithmetic operations of equation (2) are made for respective elements in the matrix.

Figure 24:
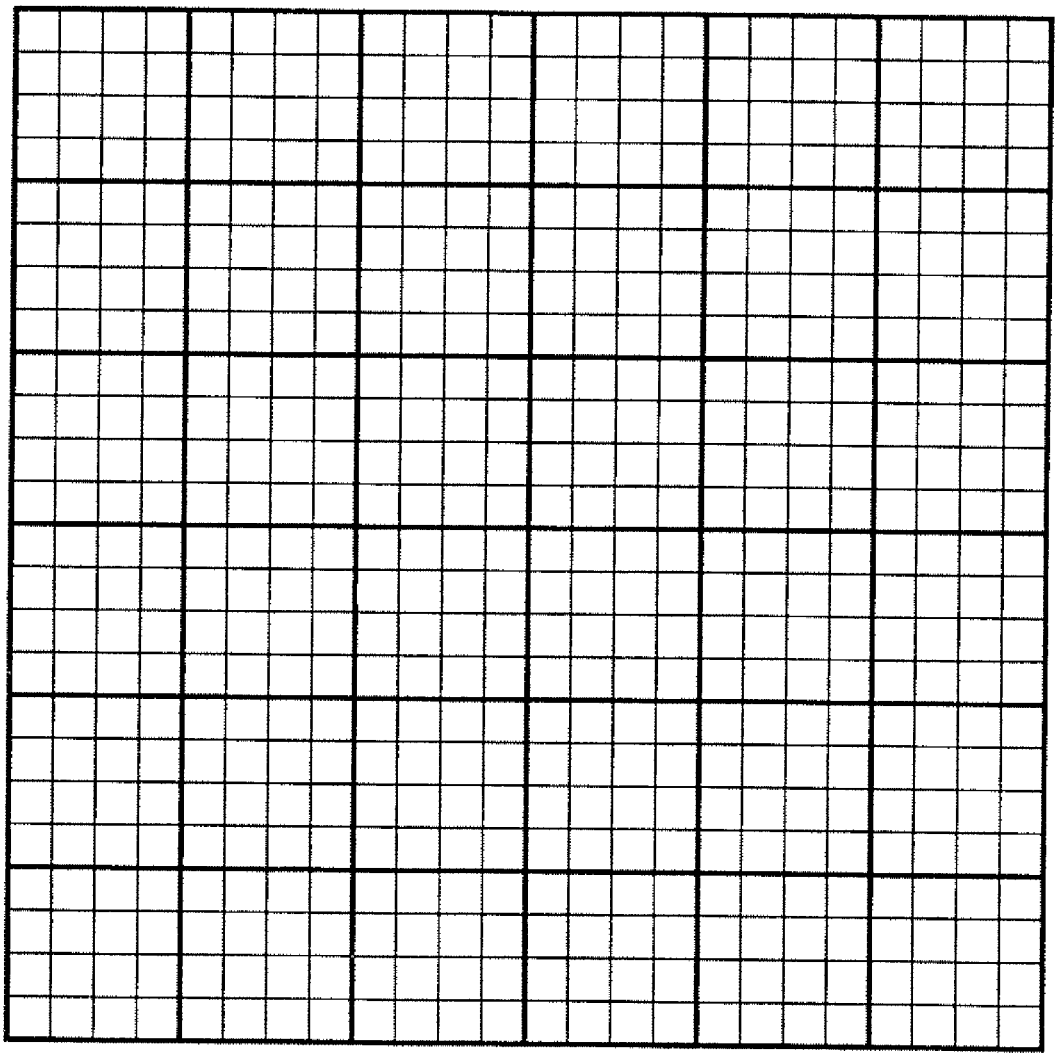
FIG. 24 shows an example of the configuration of image data.

The process given by equation (2) and shown in FIG. 23 is repeated for whole image data I. If image data I is made up of 24×24 pixels, as shown in FIG. 24, it is broken up into blocks (macroblocks) of 4×4 pixels, which do not overlap each other, and the process given by equation (2) is executed for each macroblock.

By repeating the digital watermark embedding process for all macroblocks, watermark information can be consequently embedded in the entire image. Since one macroblock is embedded with additional information Inf consisting of n bits, embedded additional information Inf can be extracted if there is at least one macroblock. In other words, the extraction process of additional information Inf does not require the entire image, and only a portion of image data (at least one macroblock) suffices to execute that process. A feature that additional information Inf can be extracted from a portion of image data I will be referred to as "having clipping robustness" hereinafter.

Generated image data I' embedded with additional information Inf as a digital watermark becomes a final output of the embedding processor via the image output unit 4006.

[Digital Watermark Extraction Processor]

Figure 25:
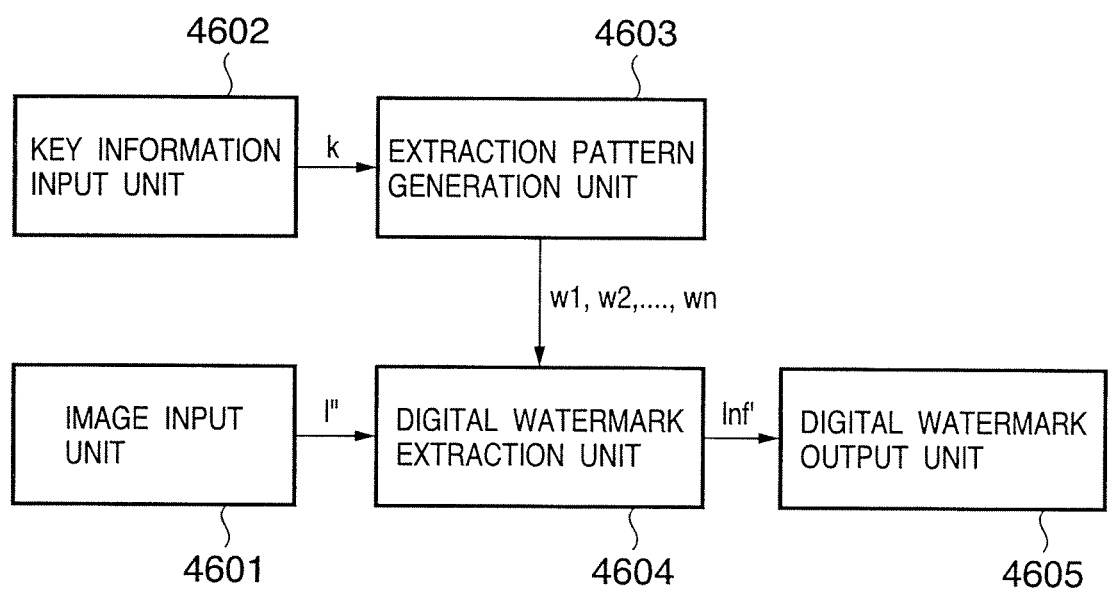
FIG. 25 is a block diagram showing the arrangement of an extraction processor (function module) for extracting watermark information embedded in an image.

FIG. 25 is a block diagram showing the arrangement of the extraction processor (function module) for extracting watermark information embedded in an image.

The embedding processor comprises an image input unit 4601, key information input unit 4602, digital watermark (extraction pattern) generation unit 4603, digital watermark extraction unit 4604, and digital watermark output unit 4605. Note that the digital watermark extraction process may be implemented by software having the aforementioned arrangement.

The image input unit 4601 receives image data I" in which watermark information may be embedded. Note that image data I" input to the image input unit 4601 may be any of image data I' embedded with watermark information by the aforementioned embedding processor, attacked image data I', and image data I in which no watermark information is embedded.

The key information input unit 4602 receives key information k required to extract watermark information. Note that key information k input to this unit must be the same one input to the key information input unit 4003 of the aforementioned embedding processor. If different key information is input, additional information cannot be normally extracted. In other words, only the user who has correct key information k can extract correct additional information Inf'.

Figure 26:
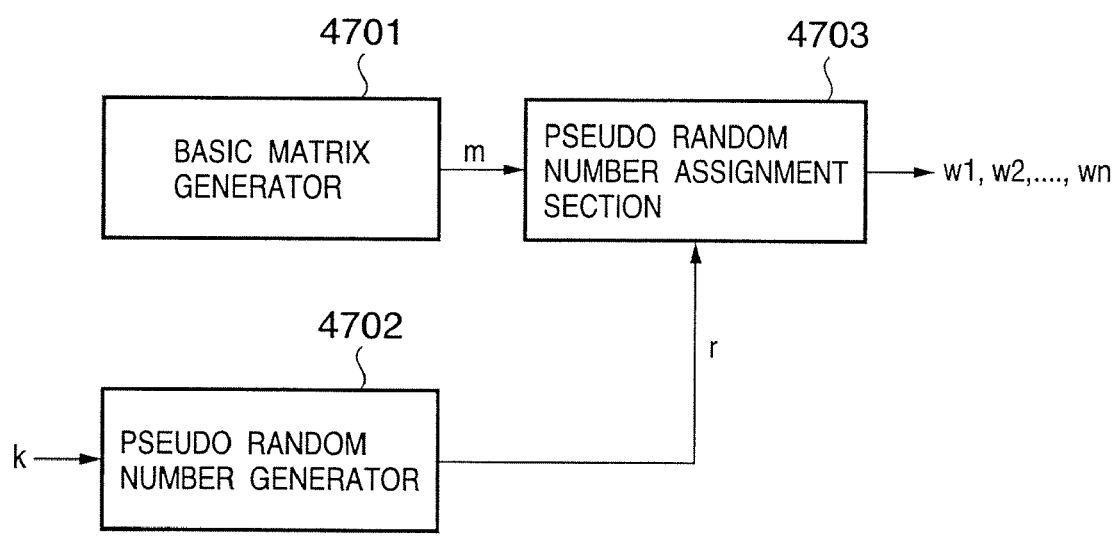
FIG. 26 is a block diagram showing details of processes of an extraction pattern generator.

The extraction pattern generation unit 4603 receives key information k, and generates an extraction pattern on the basis of key information k. FIG. 26 shows details of the process of the extraction pattern generation unit 4603. The extraction pattern generation unit 4603 comprises a basic matrix generator 4701, pseudo random number generator 4702, and pseudo random number assignment section 4703. Since the basic matrix generator 4701 and pseudo random number generator 4702 execute the same operations as those of the aforementioned basic matrix generator 4101 and pseudo random number generator 4102, a detailed description thereof will be omitted. Note that additional information cannot be normally extracted unless the basic matrix generators 4701 and 4101 generate identical basic matrix m on the basis of identical key information k.

The pseudo random number assignment section 4703 receives basic matrix m and pseudo random number sequence r, and assigns respective elements of pseudo random number sequence r to predetermined elements of basic matrix m. The difference between this assignment section 4703 and the pseudo random number assignment section 4103 in the aforementioned embedding processor is that the pseudo random number assignment section 4103 outputs only one digital watermark w, while the pseudo random number assignment section 4703 outputs extraction patterns wn corresponding to the number of bits of additional information Inf (for n bits in this case).

Details of a process for assigning respective elements of pseudo random number sequence r to predetermined elements of basic matrix m will be explained taking the matrix 4204 shown in FIG. 15 as an example. When the matrix 4204 is used, since 4-bit additional information Inf can be embedded, four extraction patterns w1, w2, w3, and w4 are output. More specifically, respective elements of the matrix 4204 are scanned in the raster order to assign respective elements of pseudo random number sequence r to those having a value "1". Upon completion of assignment of respective elements of pseudo random number sequence r to all elements having a value "1", a matrix to which pseudo random number sequence r is assigned is generated as extraction pattern w1. FIG. 27 shows examples of extraction patterns, and shows a case wherein a real number sequence r={0.7, −0.6, −0.9, 0.8} is used as pseudo random number sequence r. The aforementioned process is repeated for elements having values "2", "3", and "4" of the matrix 4204 to generate extraction patterns w2, w3, and w4, respectively. By superposing extraction patterns w1, w2, w3, and w4 generated in this way, a pattern equal to digital watermark w generated by the embedding processor is obtained.

The digital watermark extraction unit 4604 receives image data I" and extraction patterns w1, w2, . . . , wn, and extracts additional information Inf' from image data I". In this case, it is desired that additional information Inf' to be extracted is equal to embedded additional information Inf. However, if image data I' has suffered various attacks, these pieces of information do not always match.

Figure 28:
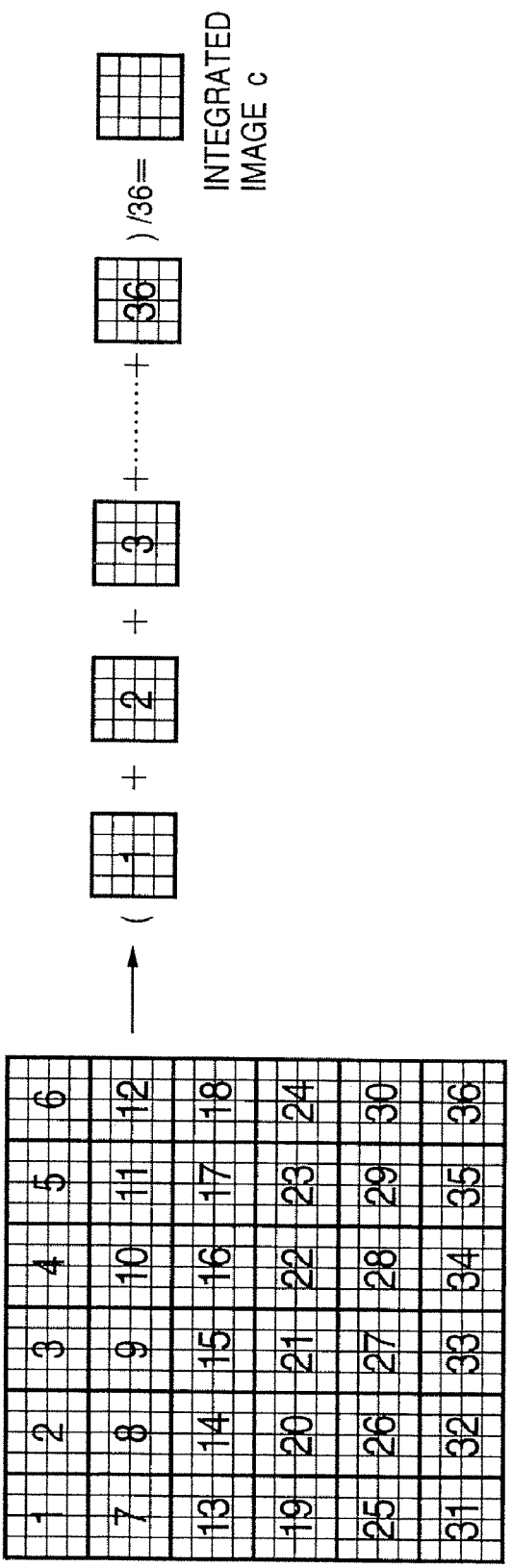
FIG. 28 is a view for explaining an integrated image.

The digital watermark extraction unit 4604 calculates correlation values between integrated image c generated from image data I" and extraction patterns w1, w2, . . . , wn. Integrated image c is obtained by dividing image data I" into macroblocks, and calculating the average of element values of each macroblock. FIG. 28 is a view for explaining integrated image c when extraction patterns of 4×4 pixels, and image data I" of 24×24 pixels are input. Image data I" shown in FIG. 28 is broken up into 36 macroblocks, and integrated image c is obtained by calculating the average values of respective element values of these 36 macroblocks.

Correlation values between integrated image c generated in this way, and extraction patterns w1, w2, . . . , wn are calculated respectively. A correlation coefficient is a statistical quantity used to measure similarity between integrated image c and extraction pattern wn, and is given by:

$$\rho = c'^T \cdot w'n / |c'^T| |w'n| \quad (3)$$

where c' and w'n are matrices each of which has as elements the differences between respective elements and the average values of the elements, and $c'^T$ is the transposed matrix of c'.

Correlation coefficient ρ assumes a value ranging from −1 to +1. If positive correlation between integrated image c and extraction pattern wn is strong, ρ approaches +1; if negative correlation is strong, ρ approaches −1. "Positive correlation is strong" means that "extraction pattern wn becomes larger with increasing integrated image c", and "negative correlation is strong" means that "extraction pattern wn becomes smaller with increasing integrated image c". When integrated image c and extraction pattern wn have no correlation, ρ=0.

Based on the correlation values calculated in this way, whether or not additional information Inf' is embedded in image data I" and whether each bit that forms additional information Inf' is '1' or '0' if the additional information is embedded are determined. That is, the correlation coefficients between integrated image c and extraction patterns w1, w2, . . . , wn are calculated, and if each calculated correlation coefficient is close to zero, it is determined that "no additional information is embedded"; if each correlation coefficient is a positive number separated from zero, it is determined that '1' is embedded; and if each correlation coefficient is a negative number separated from zero, it is determined that '0' is embedded.

Calculating correlation is equivalent to evaluation of similarities between integrated image c and extraction patterns w1, w2, . . . , wn. That is, when the aforementioned embedding processor embeds a pattern corresponding to extraction patterns w1, w2, . . . , wn in image data I" (integrated image c), correlation values indicating higher similarities are calculated.

Figure 29:
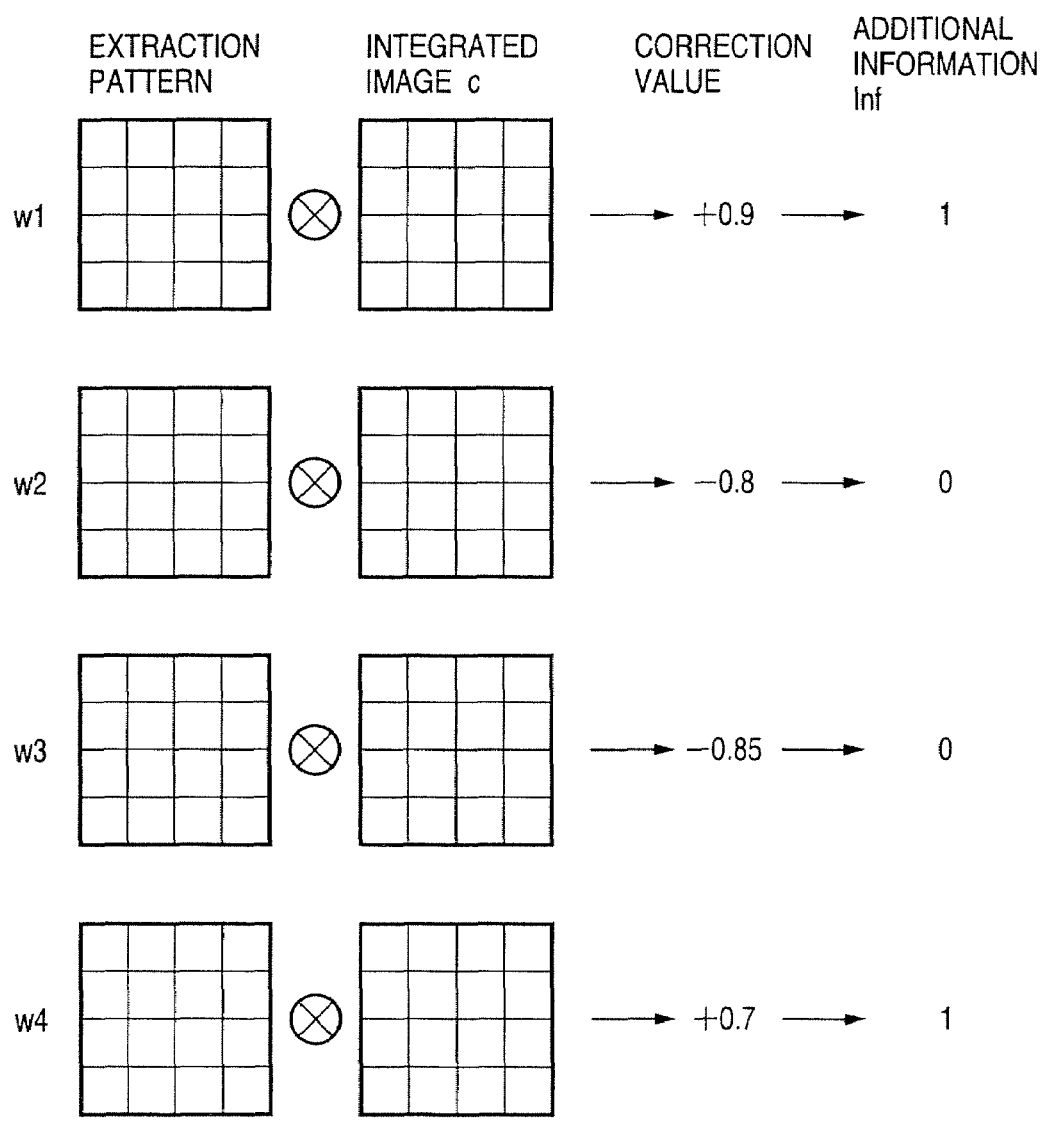
FIG. 29 shows an example of extraction of a digital watermark.

FIG. 29 shows an example wherein a digital watermark is extracted from image data I" (integrated image c) embedded with 4-bit additional information using w1, w2, w3, and w4.

The correlation values between integrated image c and four extraction patterns w1, w2, . . . , wn are respectively calculated. When additional information Inf is embedded in image data I" (integrated image c), correlation values are calculated as, e.g., 0.9, −0.8, −0.85, and 0.7. Based on this calculation result, it is determined that additional information Inf' is "1001", and 4-bit additional information Inf' can be finally output.

Extracted n-bit additional information Inf' is output as an extraction result of the extraction processor via the digital watermark output unit 4605. In this case, if the embedding processor has made an error correction encoding process and encryption process upon embedding additional information Inf, an error correction decoding process and decryption process are executed. The obtained information is finally output as a binary data sequence (additional information Inf').

Modification of Third Embodiment

In the above description, a document watermark and background watermark are selectively used as watermarks. However, the present invention is not limited to such specific watermarks, and watermarking schemes optimal to respective objects may be selectively used.

Also, authentication control is implemented using a password. However, the present invention is not limited to such specific example, but authentication control may be implemented by key control.

Fourth Embodiment

An image processing apparatus according to the fourth embodiment of the present invention will be described below. Note that the same reference numerals in the fourth embodiment denote substantially the same building components as those in the third embodiment, and a detailed description thereof will be omitted.

[Arrangement]

Figure 30:
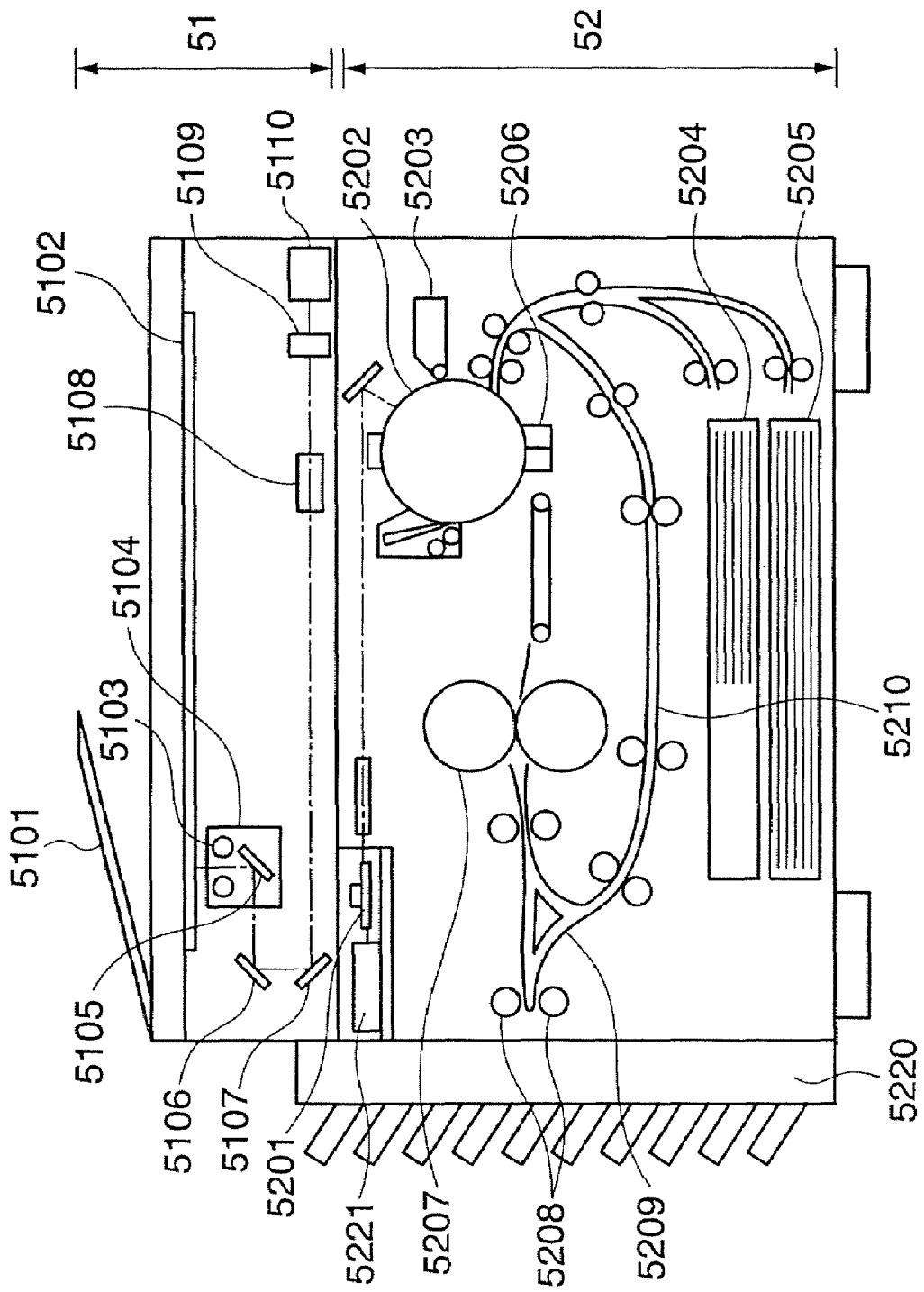
FIG. 30 is a sectional view showing an example of the structure of a digital copying machine.

FIG. 30 shows the outer appearance of the structure of a digital copying machine. The digital copying machine comprises a reader unit 51 which digitally scans a document image, and generates digital image data by way of a predetermined image process, and a printer unit 52 which generates a copy image based on the generated digital image data.

A document feeder 5101 of the reader unit 51 feeds documents one by one in turn from the last page onto a platen glass 5102. Upon completion of reading of each document image, the feeder 5101 exhausts a document on the platen glass 5102. When a document is fed onto the platen glass 5102, a lamp 5103 is turned on, and a scanner unit 5104 begins to move, thus exposing and scanning the document. Light reflected by the document at this time is guided to a CCD image sensor (to be referred to as "CCD" hereinafter) 5109 via mirrors 5105, 5106, and 5107, and a lens 5108 so as to form an optical image on it. In this way, the scanned document image is read by the CCD 5109, and an image signal output from the CCD 5109 undergoes image processes such as shading correction, sharpness correction, and the like by an image processor 5110. After that, the processed image signal is transferred to the printer unit 52.

A laser driver 5221 of the printer unit 52 drives a laser emission unit 5201 in accordance with image data input from the reader unit 51. A laser beam output from the laser emission unit 5201 scans a photosensitive drum 5202 via a polygonal mirror, thereby forming a latent image on the photosensitive drum 5202. The latent image formed on the photosensitive drum 5202 is applied with a developing agent (toner) by a developer 5203 to form a toner image.

A recording sheet fed from a cassette 5204 or 5205 is conveyed to a transfer unit 5206 in synchronism with the beginning of irradiation of the laser beam, and the toner image applied to the photosensitive drum 5202 is transferred onto the recording sheet. The recording sheet on which the toner image has been transferred is conveyed to a fixing unit 5207, and the toner image is fixed to the recording sheet by heat and pressure of the fixing unit 5207. The recording sheet which has left the fixing unit 5207 is exhausted by exhaust rollers 5208. A sorter 5220 sorts recording sheets by storing exhausted recording sheets on respective bins. Note that the sorter 5220 stores recording sheets on the uppermost bin if a sort mode is not selected.

If a both-side recording mode is set, after the recording sheet is conveyed to the position of the exhaust rollers 5208, it is guided onto a re-feed paper convey path by the exhaust rollers 5208 which are rotated in the reverse direction, and a flapper 5209. If a multiple recording mode is set, the recording sheet is guided onto the re-feed paper convey path before it is conveyed to the exhaust rollers 5208. The recording sheet conveyed onto the re-feed paper convey path is fed to the transfer unit 5206 at the aforementioned timing.

[Process]

Figure 31:
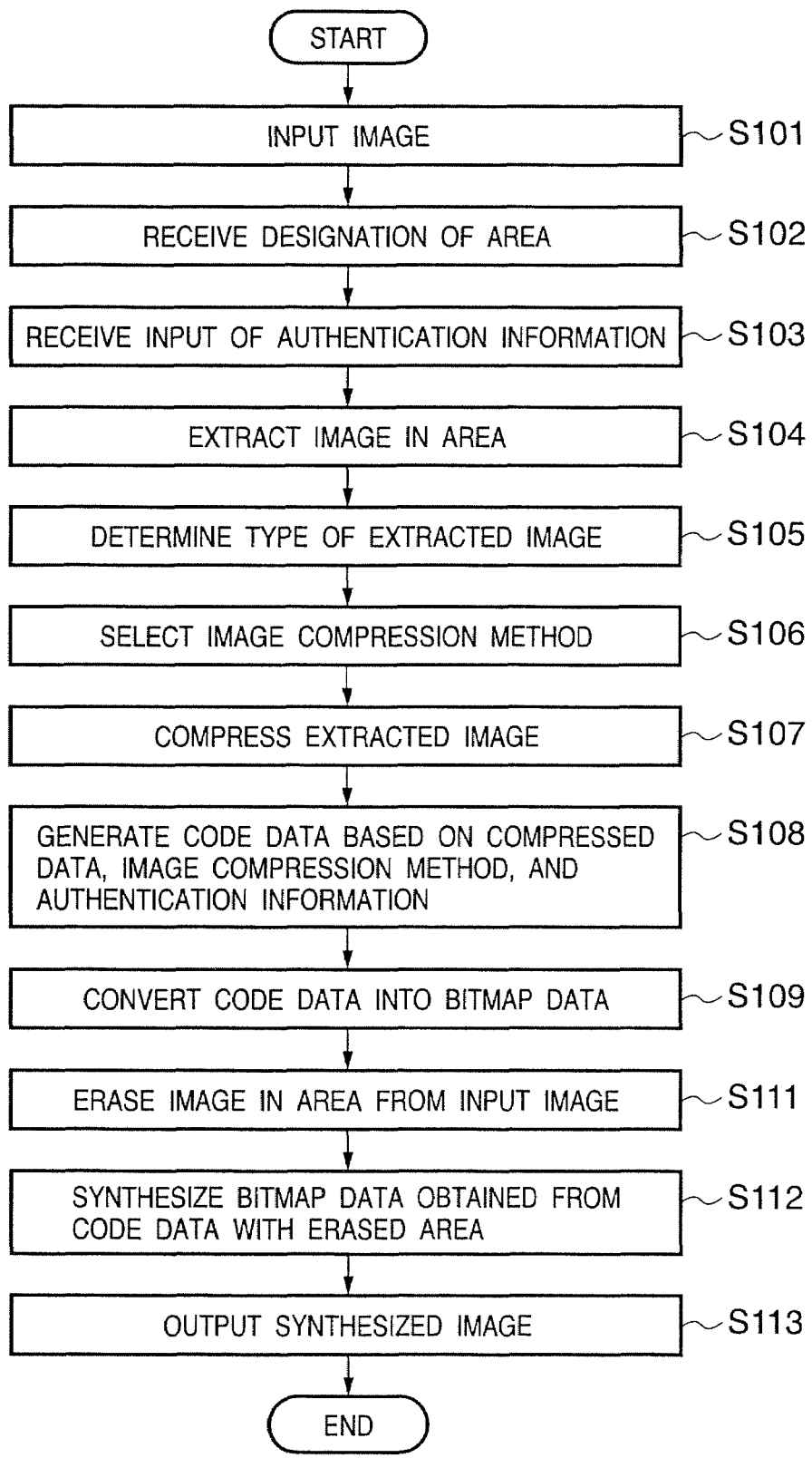
FIG. 31 is a flow chart showing the process for hiding an area-designated image, which is executed by an image processor in a reader unit.

FIG. 31 is a flow chart showing the process for hiding an area-designated image, which is executed by the image processor 5110 in the reader unit 51.

Upon reception of an image signal from a document, the image processor 5110 generates digital image data obtained by normally quantizing luminance information for respective fine pixels at a precision of about 8 bits (S101). The spatial resolution of a pixel is around 42 μm×42 μm, and corresponds to a resolution of about 600 pixels per inch (25.4 mm) (600 dpi). The image processor 5110 displays an image represented by the generated image data on a screen of a console shown in FIG. 32.

Figure 32:
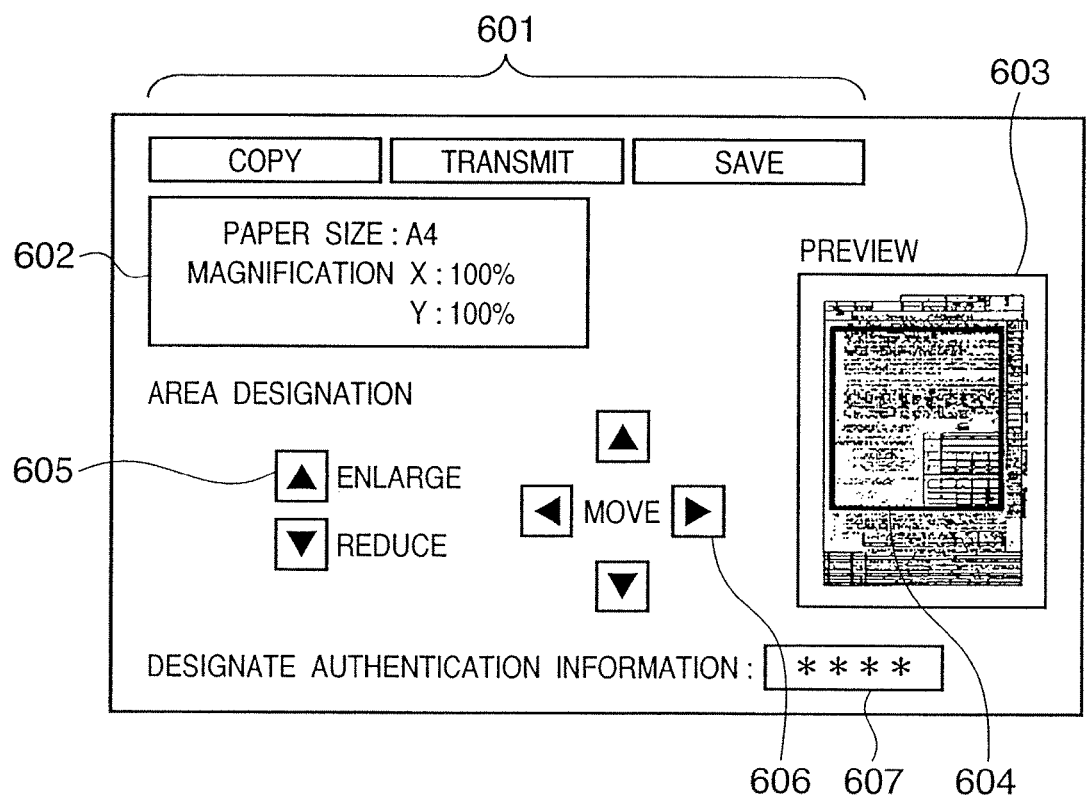
FIG. 32 shows an outline of a console.

The console normally comprises a liquid crystal display, the surface of which is covered by a touch panel, and allows the user to make desired operations by operating buttons displayed on the screen. Referring to FIG. 32, buttons 601 are used to select an apparatus mode: a "copy" mode copies a read document image (by outputting it from the printer unit 52), a "transmit" mode transmits image data of the read image to a remote place via a network as a digital file, and a "save" mode saves image data of the read image in an auxiliary storage device such as a hard disk or the like incorporated in the apparatus as a digital file. In this case, assume that the "copy" mode has been selected, and its button frame is indicated by a bold line.

A display unit 602 displays basic operation conditions of the apparatus in accordance with the selected mode. Upon selection of the copy mode, the display unit 602 displays the output recording sheet size and enlargement/reduction scale. A preview display unit 603 displays the entire image read by the reader unit 51 in a reduced scale. A frame 604 displayed on the preview display unit 603 indicates an area set on a preview-displayed image. The size of an area indicated by the frame 604 (to be simply referred to as "area" hereinafter) is determined by operating one of buttons 605, and the area moves vertically or horizontally upon operation of each of buttons 606. In other words, the size and position of the area 604 on the preview display unit 603 change upon operation of the buttons 605 and 606.

A box 607 is used to input authentication information (to be described later). For example, a character string of four digits is input using a ten-key pad (not shown), and symbols "*" or the like corresponding in number to the digits of the input character string are displayed. The reason why symbols "*" are displayed in place of directly displaying the input character string is to improve security.

The image processor 5110 accepts the area 604 and authentication information which are designated and input by the user using the console (S102, S103). Upon completion of designation and input, the image processor 5110 extracts image data designated by the area 604 from the input image data (S104), determines the type of extracted image data (S105), selects an image compression method corresponding to the determination result (S106), and compresses the extracted image data by the selected image compression method (S107). Then, the image processor 5110 generates code data by synthesizing an identification code that indicates the image compression method used, and the input authentication information (S108), and converts the generated code data into bitmap data by a method to be described later (S109). The image processor 5110 erases image data in the area 604 from the input image data (S111), synthesizes image data embedded with the bitmap code data obtained in step S109 to a blank area after erasure (S112), and outputs the synthesized image data (S113).

In this case, since the copy mode is selected as the apparatus mode, the output image data is sent to the printer unit 52, and a copy image is formed on a recording sheet. Likewise, if the transmit mode is selected as the apparatus mode, the output image data is sent to a network communication unit, and is digitally transferred to a predetermined destination. If the save mode is selected, the output image data is stored in an auxiliary storage device in the apparatus.

Figure 33:
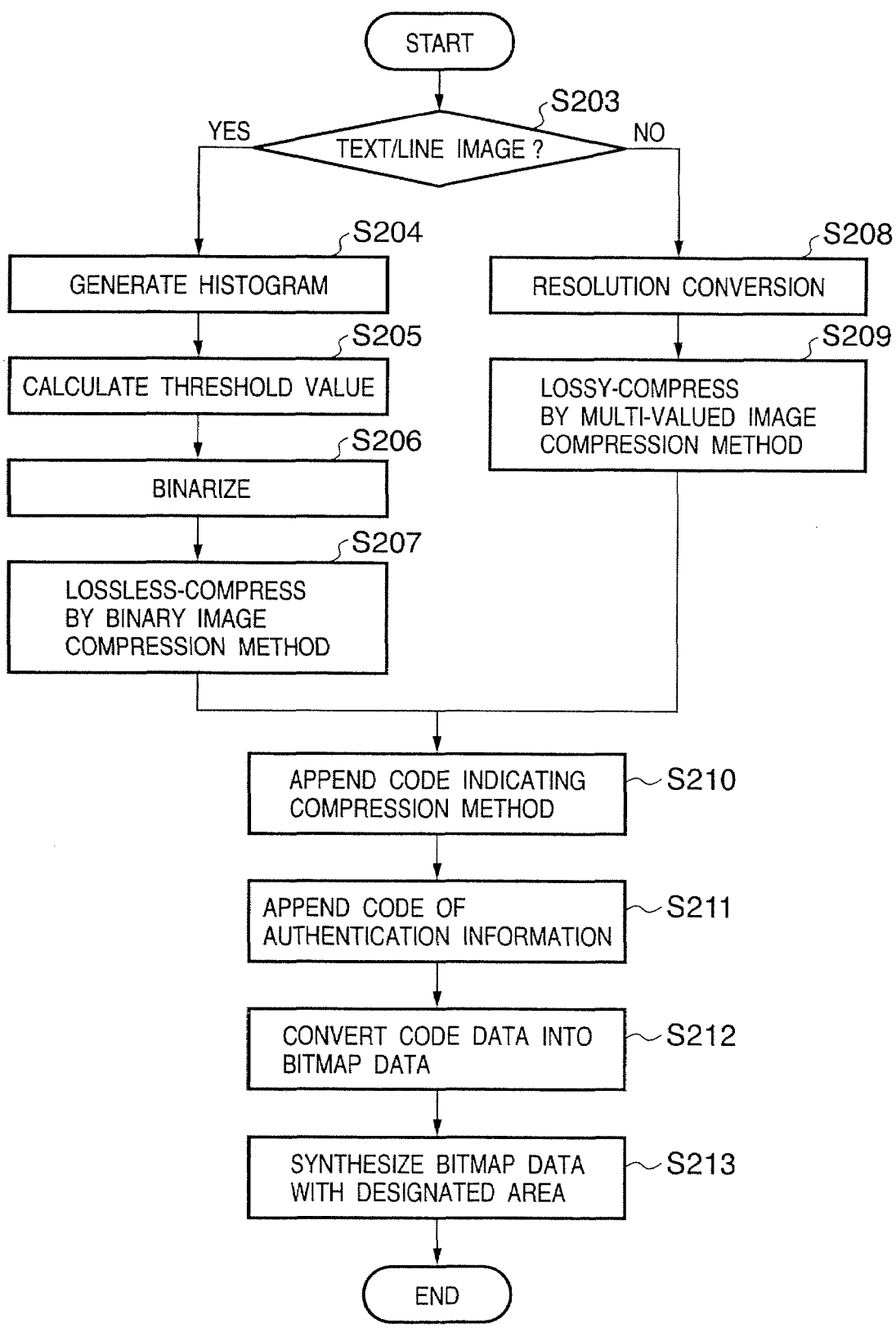
FIG. 33 is a flow chart for explaining the processes in steps S105 to S111 shown in FIG. 31 in detail.

FIG. 33 is a flow chart for explaining the processes in steps S105 to S112 in detail.

Initially, the type of extracted image data is determined. In this case, it is checked if the area-designated image is a continuous tone image such as a photo or the like or a binary image such as a text/line image (S203). As a determination method, various methods such as a method using a histogram indicating the luminance distribution of an objective image, a method using the frequencies of occurrence for respective spatial frequency components, a method using whether or not an objective image is more likely to be recognized as "line" by pattern matching, and the like have been proposed, and such known methods can be used.

If it is determined that the extracted image is a text/line image, a histogram indicating the luminance distribution of the image is generated (S204), and an optimal threshold value that can be used to separate the background and text/line image is calculated based on this histogram (S205). Using this threshold value, the image data is binarized (S206), and the obtained binary image data undergoes a compression process (S207). This compression process can adopt a known binary image compression method. Normally, as a binary image compression method, one of lossless compression methods free from any losses of information (e.g., MMR compression, MR compression, MH compression, JBIG compression, and the like) is adaptively used. Of course, it is possible to adaptively use one of the above methods so as to minimize the code size after compression.

On the other hand, if it is determined that the extracted image is a continuous tone image, resolution conversion is made (S208). The input image data is read at, e.g., 600 dpi. However, it is usually the case that a halftone image such as a photo or the like does not appear to deteriorate at about 300 dpi. Hence, in order to reduce the final code size, the image data is converted into that corresponding to 300 dpi by reducing the vertical and horizontal sizes to ½. The 300-dpi multi-valued image data then undergoes a compression process (S209). As a compression method suited to a multi-valued image, known JPEG compression, JPEG2000 compression, and the like can be used. Note that these compression methods are lossy ones in which an original image suffers deterioration which is normally visually imperceptible.

Code information used to identify the compression method is appended to the obtained compressed image data (S210). This information is required to designate an expansion method upon reconstructing an original image from an output image. For example, the following identification codes are assigned in advance to the respective compression methods:

JPEG compression→BB
JPEG2000→CC
MMR compression→DD
MH compression→EE
JBIG compression→FF Then, a code of authentication information is appended (S211). The authentication information is required to discriminate if a person who is about to reconstruct an image has the authority of doing it upon reconstructing an original image from an output image. Only when authentication information appended in this step is correctly designated upon reconstruction, a reconstruction process to an original image is executed.

A digital signal sequence of the code data obtained in this way is converted as a binary number into binary bitmap data (S212), and is synthesized to the area 604 by embedding (S213).

Figure 34:
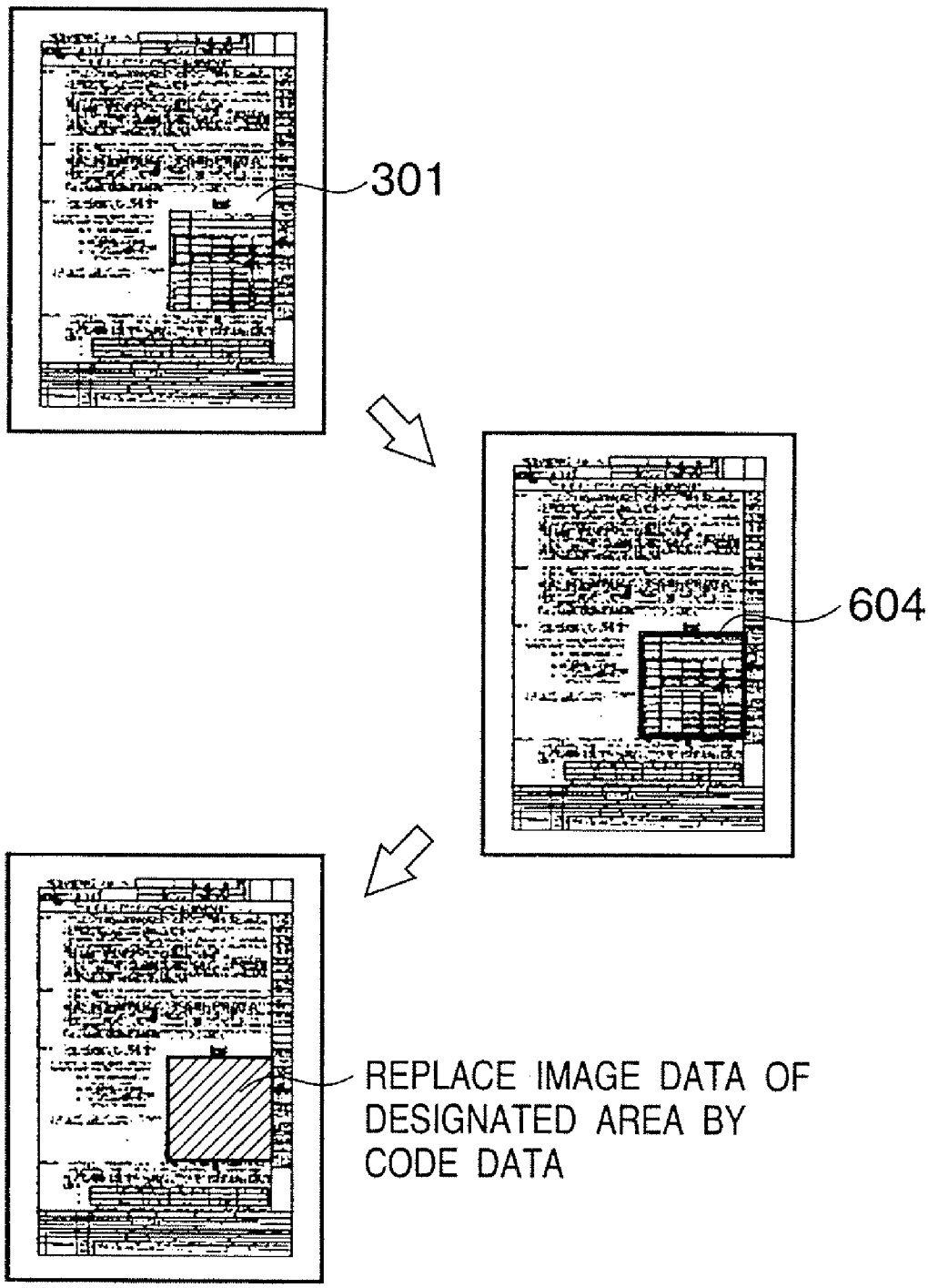
FIG. 34 depicts the contents of the flow shown in FIG. 33.

FIG. 34 depicts the aforementioned operations. when the area 604 is designated on input image data 301, image data within the area 604 is erased, and is replaced by bitmap code data.

Figure 35:
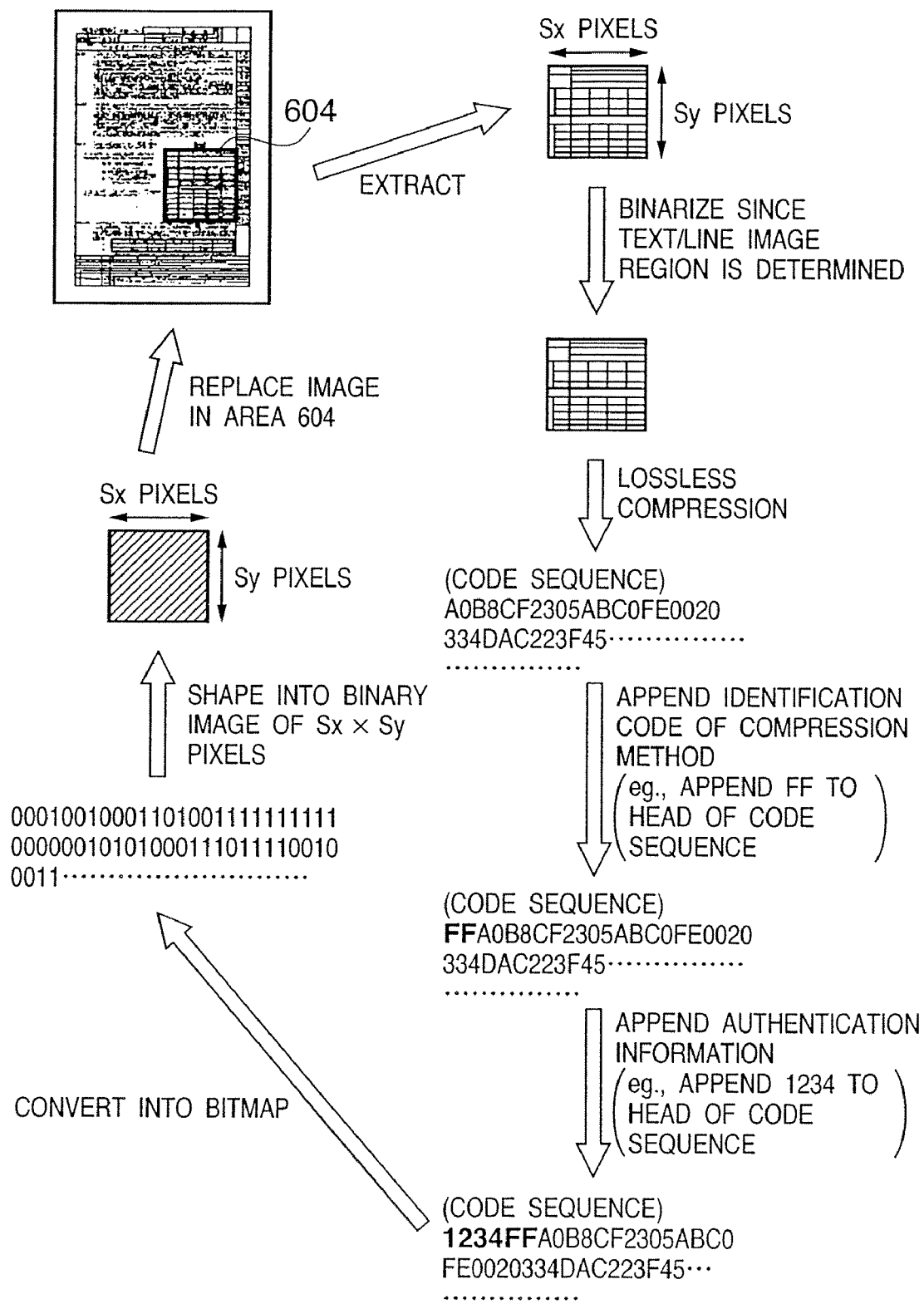
FIG. 35 depicts the contents of the flow shown in FIG. 33.

FIG. 35 depicts the contents of the flow shown in FIG. 33.

An image of Sx×Sy pixels in the area 604 is extracted, and since it is determined that this extracted image is a text/line image, the image undergoes binarization and lossless compression. An identification code of the compression method is appended to, e.g., the head of the compressed code sequence, and authentication information is also appended to the head of the resultant code sequence. After binarization and bitmap conversion, bitmap data having the same size as the area 604, i.e., Sx×Sy pixels, is generated, and replaces an image in the area 604. Of course, the appending positions of the identification code and authentication information are not limited to the head of the code sequence. For example, the identification code and authentication information may be appended to other arbitrarily predetermined positions (e.g., the end of the code sequence or predetermined bit positions). Furthermore, the identification code and authentication information may be repetitively appended to a plurality of positions to make sure extraction of them.

[Bitmap Conversion of Code Data]

Figure 38:
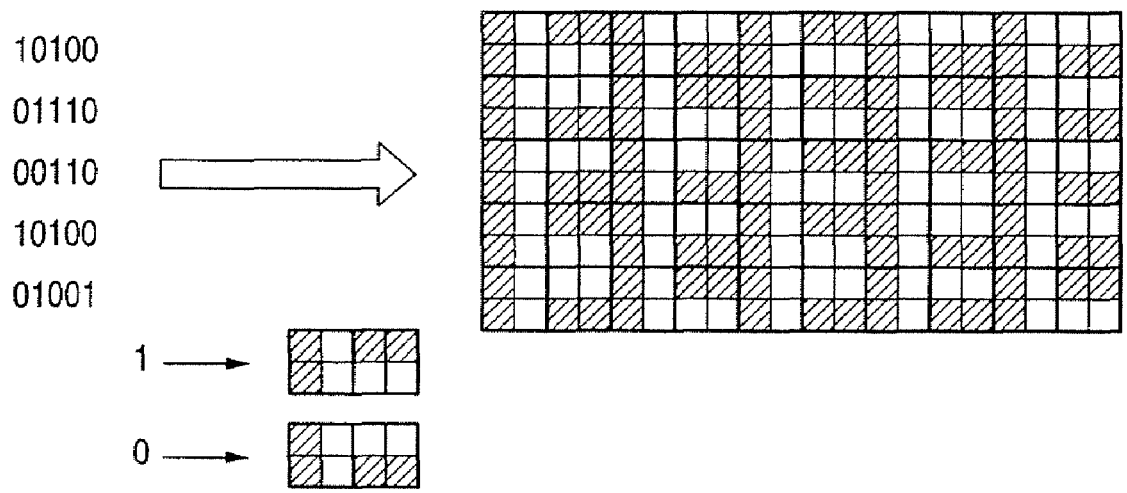

FIGS. 36 to 38 are views for explaining the method of converting code data into bitmap data, and show three different methods. In each of FIGS. 36 to 38, a small rectangle indicates one pixel at 600 dpi.

In the method shown in FIG. 36, pixels at 600 dpi are converted into bitmap data so that 2×2 pixels have 1-bit information. If code data (left side) expressed as a binary number is '1', four (2×2) pixels are set to '1' (black); if code data is '0', four pixels are set to '0' (white). Consequently, binary bitmap data having a resolution (300 dpi) ½ of 600 dpi is generated. The reason why 2×2 pixels are used to express 1-bit information is to eliminate the influences of the reading precision, positional deviation, magnification error, and the like of the reader and to accurately reconstruct code data from a bitmap image upon reconstructing an original image by scanning a bitmap image printed on a recording sheet by the reader according to this embodiment.

In the method shown in FIG. 37, in place of setting all of 2×2 pixels to have identical values, if code data is '1', the upper left small pixel (corresponding to 600 dpi) of four pixels is set to '1' (black); if code data is '0', the lower right small pixel is set to '1' (black). With this configuration, the reliability upon reconstructing an original image by scanning the printed bitmap image can be improved.

In the method shown in FIG. 38, 1 bit is expressed by 4×2 pixels, and '1' and '0' are expressed by layouts of black and white pixels shown in FIG. 38. With this configuration, the data size that can be recorded per unit area is reduced, but the reading precision upon reconstructing an original image can be further improved.

Note that the bitmap conversion method is not limited to those described above, and various other methods may be used.

The size of bitmap data to be generated, and the size of information that can be embedded in that data will be described below.

Assuming that the area 604 has a size of 2"×2" (about 5 cm in both the vertical and horizontal directions) on a document, since original image data is 600 dpi, each of Sx and Sy amounts to 1200 pixels. That is, if 8 bits are assigned per pixel, the information size of image data in the area 604 is:

1200×1200×8=11,520,000 bits=11M bits

When code data is converted into bitmap data by one of the aforementioned methods, and replaces an image in the area 604, since the methods of FIGS. 36 and 37 embed 1-bit information using four pixels, the size of information that can be recorded is reduced to ¼×⅛=1/32, and the data size that can be embedded in the 2"×2" area 604 is:

11M/32=0.34M bits

Put differently, it is impractical since image data of 11M bits must be compressed to 1/32, i.e., 0.34M bits. For this reason, the image property of the area 604 must be determined to adaptively switch the binarization, resolution conversion, and compression method. If an image in the area 604 is a text/line image, it is binarized while the resolution of 600 dpi is kept unchanged. As a result, the data size of the image can be reduced to ⅛, i.e., (11/8=) 1.38M bits. In order to further reduce this data size to 0.34M bits, ¼ compression is required. However, this compression ratio can be easily achieved by MMR or JBIG compression. Of course, since the code information of the compression method, authentication information, and the like must also be embedded, a compression ratio higher than ¼ is required, but such ratio can still relatively easily be achieved.

On the other hand, in case of a photo/halftone image, the resolution is halved (300 dpi) while the number of gray scales of 8 bits remains unchanged, thereby reducing the data size to ¼, i.e., (11/4=) 2.75M bits. In order to further reduce this data size to 0.34M bits, ⅛ compression is required. However, this compression ratio can be achieved by JPEG or JPEG2000 very easily while suppressing image quality deterioration.

If the bitmap conversion method shown in FIG. 38 is adopted, the size of information that can be embedded is further reduced to ½, and the compression ratio must be doubled. However, this bitmap conversion method does not yield an impractical value as the aforementioned compression method.

[Reconstruction of Original Image]

Figure 39:
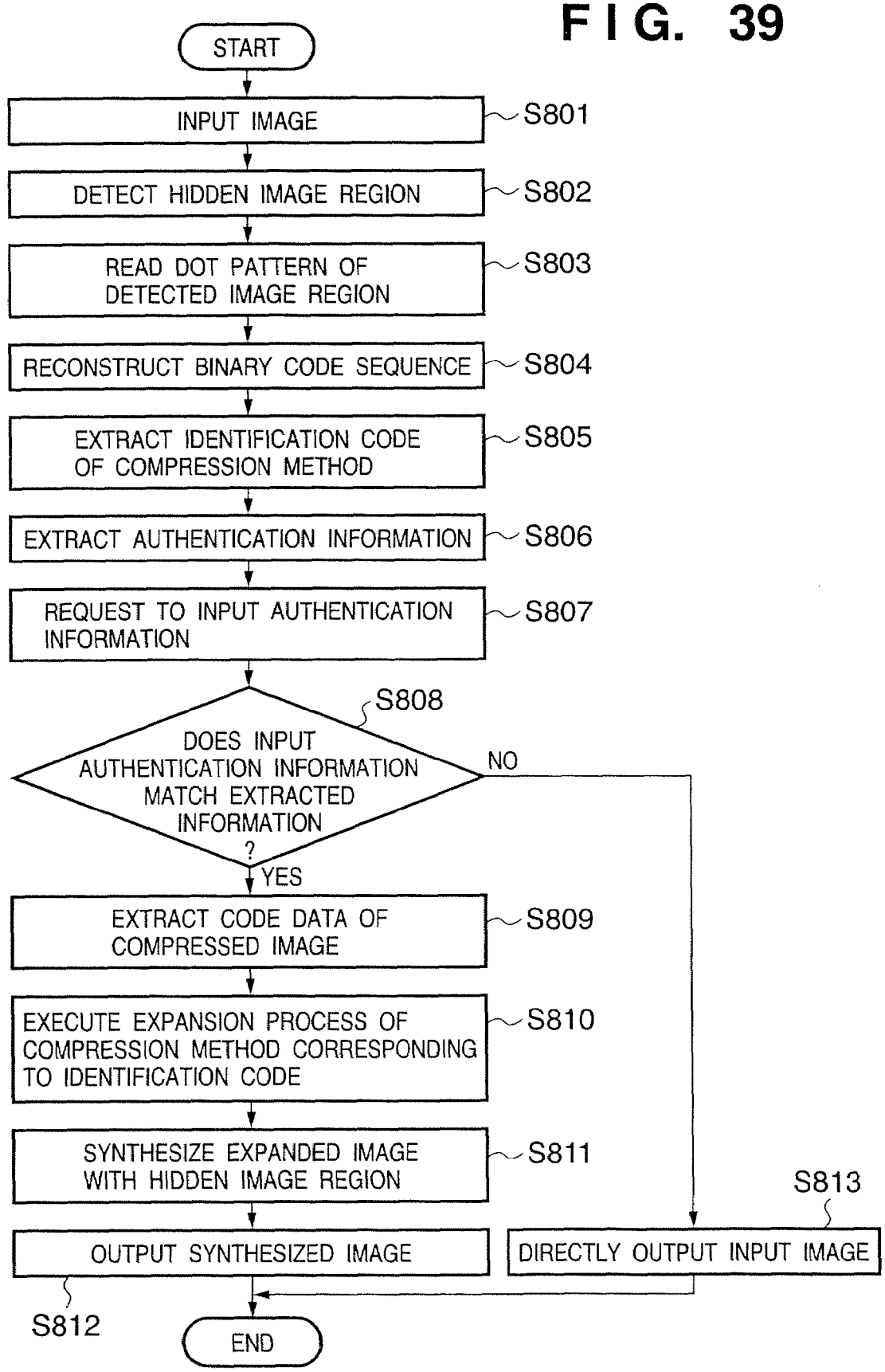
FIG. 39 is a flow chart for explaining the method of reconstructing an original image from bitmap data, which is executed by the image processor in the reader unit.

FIG. 39 is a flow chart for explaining the method of reconstructing an original image from bitmap data, which is executed by the image processor 5110 in the reader unit 51.

The image processor 5110 inputs an image (S801). If an image on a printout is to be input, that image can be read by the reader unit 51 and can be input as a digital image; if an image is digitally transmitted or saved, it can be directly input as a digital image.

The image processor 5110 detects a hidden image area from the input image (S802). This detection adopts a method of, e.g., detecting a rectangular region included in the input image, and determining the hidden image area if periodic patterns of black and white pixels are present in the detected rectangular region.

The image processor 5110 reads a pixel sequence from image data of the detected, hidden image area (S803), and determines a bitmap conversion method of that image data to reconstruct a binary code sequence (S804). From the code sequence, the image processor 5110 extracts an identification code indicating a compression method (S805), and also authentication information (S806).

Next, the image processor 5110 displays a message the input image includes a hidden image on, e.g., the screen of the console, and prompts the user to input authentication information required to reconstruct an image (S807). If the user inputs the authentication information, the image processor 5110 checks if the input authentication information matches the extracted authentication information (S808). If they do not match, the image processor 5110 directly outputs the input image (S813).

If the two pieces of authentication information match, the image processor 5110 reconstructs an original image. In this case, the image processor 5110 extracts code data of a compressed image except for the identification code of the compression method and authentication information from the code sequence (S809), and applies an expansion process of the compression method corresponding to the extracted identification code to the extracted code data (S810). The image processor 5110 then replaces the image of the detected, hidden image area by the expanded image (S811), and outputs the obtained synthesized image (S812). On the image to be output in this step, an original image before the area-designated image is hidden is reconstructed.

In this way, by converting code data obtained by efficiently compressing an area-designated partial image into bitmap data, and synthesizing the bitmap data to an original image, the area-designated image can be hidden by replacing it by a visually unidentifiable image. If such unidentifiable image (hidden image area) is found, the image of that area is recognized (decoded) as code data, and an original image can be reconstructed by a user who has the authority of browsing or the like on the basis of the identification code of the compression method set in the code data with reference to authentication information set in that code data.

Hence, the user who has the predetermined authority can reconstruct an original image, and can display, print, copy, transmit, and/or save the original image. Note that authentication information may be independently set for each of image operations, i.e., charge, display, print, copy, send, and save operations, or may be set together for each of groups of image operations such as display and print, copy and send, and the like.

Modification of Fourth Embodiment

In the above description, one area 64 is designated to hide an image of that area, as shown in FIG. 34 and the like. However, the number of areas to be hidden is not limited to one, and a plurality of areas can be designated. In this case, the processes in steps S102 to S112 can be repeated for respective designated areas. When an original image is reconstructed from an image having a plurality of hidden image areas, the processes in steps S803 to S811 can be repeated for respective detected, hidden image areas.

In the above description, the information hiding method, encoding method, and reconstruction method for a document image to be read by the digital copying machine have been explained. However, these methods can also be applied to documents, figures, and the like on a PC (personal computer). In this case, when the user instructs to print a document or figure, a device driver corresponding to a printer which is used to print is launched, and generates image data for a printout on the basis of print code generated by an application on the PC. The device driver displays the generated image data for preview on its user interface window, as shown in FIG. 32, and accepts designation of the area 604 that the user wants to hide, and input of authentication information. Or the device driver detects the hidden image area. The subsequent processes are the same those described above, but are implemented by the device driver on the PC (more specifically, a CPU which executes device driver software).

In the above description, code data is converted into bitmap data. However, an original image cannot often be accurately reconstructed due to distortion of a printed image, stains on a recording sheet, and the like. In order to avoid such troubles, if code data is converted into bitmap data after an error correction code is appended to the code data, the reliability of data recorded as a bitmap can be improved. Since various known methods have been proposed for error correction codes, such methods can be used. In this case, however, since the size of information that can be embedded is reduced, a higher compression ratio of an image must be set accordingly. Of course, in addition to the error correction code, code data may be converted into bitmap data after it is encrypted, so as to improve robustness against information leakage.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above-described embodiments, and various changes and modifications can be made within the spirit and scope of the present invention. Therefore, in order to apprise the public of the scope of the present invention, the following claims are made.

What is claimed is:

1. An image processing apparatus comprising:
a first input unit, arranged to input image information;
a recognizing unit, arranged to recognize a plurality of text regions included in the input image information;
a generator, arranged to generate authentication information corresponding to each text region to control processing for the text region;
a setting unit, arranged to set whether text in each text region is to be visible or not after the processing for the text region is performed;
an embedding unit, arranged to embed the authentication information corresponding to each text region into the respective corresponding text region as a digital watermark, wherein the digital watermark is visible when the visible text is set for the corresponding text region and, is invisible when the invisible text is set for the corresponding text region,
wherein said image processing apparatus comprises a processor configured to function as at least said recognizing unit and said generator.

2. The apparatus according to claim 1, further comprising:
a preservation unit, arranged to preserve the text to be invisible; and
an embedding unit, arranged to embed information, which indicates a preservation place of the invisible text, into the text region corresponding to the invisible text as the digital watermark.

3. The apparatus according to claim 1, further comprising:
an extractor, arranged to extract information embedded in the text region; and
a controller, arranged to control the processing for the text region based on the extracted information.

4. The apparatus according to claim 1, further comprising:
a second input unit, arranged to input the authentication information;
a determiner, arranged to determine whether the input authentication information is appropriate or not;
a processor, arranged to perform the processing for the text region when the input authentication information is appropriate; and
a preservation unit, arranged to preserve the text to be invisible, and to embed information, which indicates a preservation place of the invisible text, into the text region corresponding to the invisible text as the digital watermark when the input authentication information is inappropriate.

5. The apparatus according to claim 1, wherein the processing for the text region includes at least one of display, print, copy, and transmission.

6. A computer-readable storage media storing a computer executable program for causing a computer to implement an image processing apparatus according to claim 1.

7. An image processing method comprising the steps of:
inputting image information;
recognizing a plurality of text regions included in the input image information;
generating authentication information corresponding to each text region to control processing for the text region;
setting whether text in each text region is to be visible or not after the processing for the text region is performed; and
embedding the authentication information corresponding to each text region into the respective corresponding text region as a digital watermark, wherein the digital watermark is visible when the visible text is set for the corresponding text region and is invisible when the invisible text is set for the corresponding text region.

8. The method according to claim 7, further comprising the steps of:

preserving the text to be invisible; and embedding information, which indicates a preservation place of the invisible text, into the text region corresponding to the invisible text as the digital watermark.

9. The method according to claim 7, further comprising the steps of:

extracting information embedded in the text region; and controlling the processing for the text region based on the extracted information.

* * * * *